United States Patent
Nguyen et al.

(10) Patent No.: US 10,393,575 B2
(45) Date of Patent: Aug. 27, 2019

(54) LIQUID SHUTTER FOR INFRARED IMAGING DEVICES

(71) Applicant: FLIR Systems, Inc., Wilsonville, OR (US)

(72) Inventors: Vu L. Nguyen, Goleta, CA (US); Theodore R. Hoelter, Santa Barbara, CA (US); Pierre Boulanger, Goleta, CA (US); Marcel Tremblay, Goleta, CA (US); Robert Pietsch, Santa Barbara, CA (US)

(73) Assignee: FLIR SYSTEMS, INC., Wilsonville, OR (US)

(*) Notice: Subject to any disclaimer, the term of this patent is extended or adjusted under 35 U.S.C. 154(b) by 0 days.

(21) Appl. No.: 15/660,870

(22) Filed: Jul. 26, 2017

(65) Prior Publication Data

US 2017/0336249 A1    Nov. 23, 2017

Related U.S. Application Data

(63) Continuation of application No. PCT/US2016/015840, filed on Jan. 29, 2016.

(60) Provisional application No. 62/203,795, filed on Aug. 11, 2015, provisional application No. 62/110,427, filed on Jan. 30, 2015.

(51) Int. Cl.
| | |
|---|---|
| H04N 7/18 | (2006.01) |
| G01J 1/04 | (2006.01) |
| H04N 5/33 | (2006.01) |
| G01J 5/08 | (2006.01) |
| G02B 26/00 | (2006.01) |
| H04N 5/235 | (2006.01) |

(52) U.S. Cl.
CPC ........... *G01J 1/044* (2013.01); *G01J 5/0834* (2013.01); *G02B 26/004* (2013.01); *H04N 5/2353* (2013.01); *H04N 5/33* (2013.01)

(58) Field of Classification Search
CPC .................................................... H04N 13/00
See application file for complete search history.

(56) References Cited

U.S. PATENT DOCUMENTS

2010/0045773 A1* 2/2010 Ritchey ............... G02B 13/06
                                                           348/36
2014/0184807 A1    7/2014 Simolon et al.

FOREIGN PATENT DOCUMENTS

| EP | 2328232 | 1/2011 |
| EP | 2423743 | 2/2012 |

\* cited by examiner

*Primary Examiner* — Anand S Rao
(74) *Attorney, Agent, or Firm* — Haynes and Boone, LLP

(57) ABSTRACT

Techniques are provided to perform flat field correction for infrared cameras using a liquid shutter. Devices and methods provide a focal plane array (FPA) that receives infrared radiation (e.g., thermal infrared radiation) from a scene, and infrared-opaque liquid disposed in a cavity of a liquid shutter housing, and a fluid controller that directs the liquid from a reservoir area of the cavity to a field of view area of the cavity to block the FPA from the infrared radiation. Flat field correction terms may be determined and radiometric calibration may be performed. In one example, a liquid shutter uses voltages to direct liquid. In another example, a liquid shutter uses magnetic fields from electromagnets to direct liquid such as ferrofluid. In another example, a liquid shutter uses electrowetting techniques to direct liquid such as water. In a further example, a liquid shutter uses a pump.

20 Claims, 16 Drawing Sheets

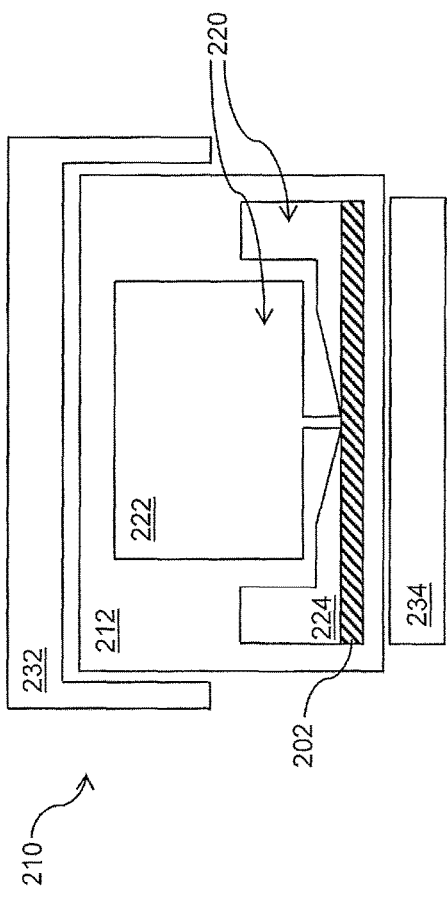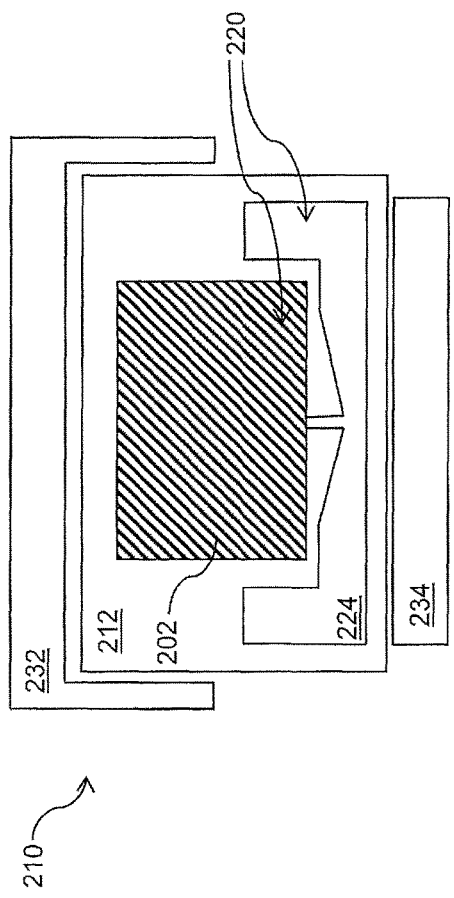

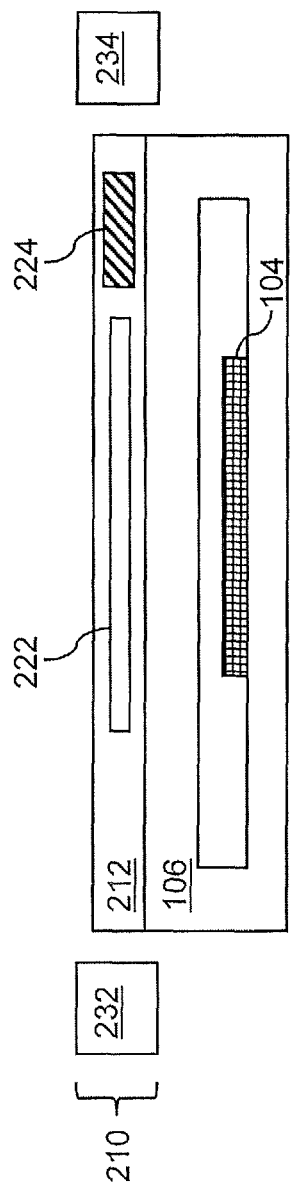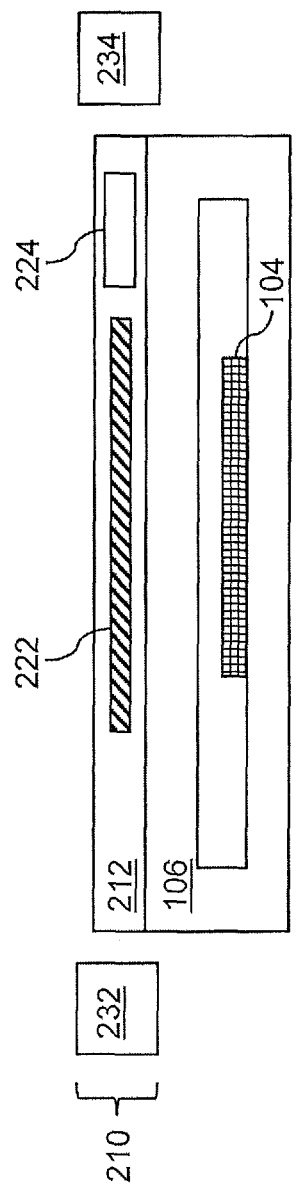

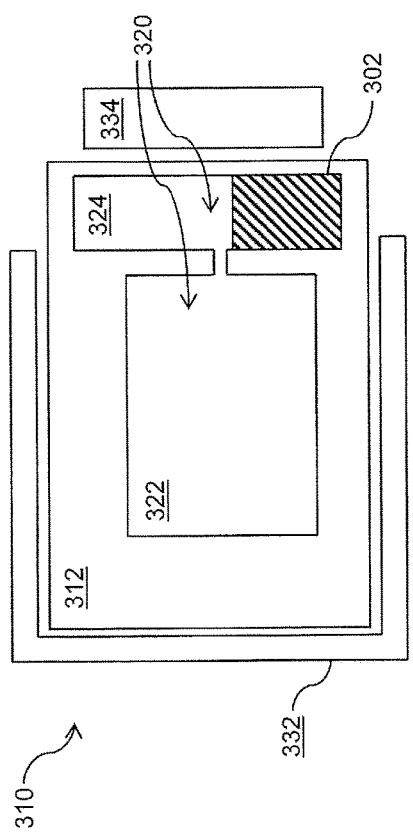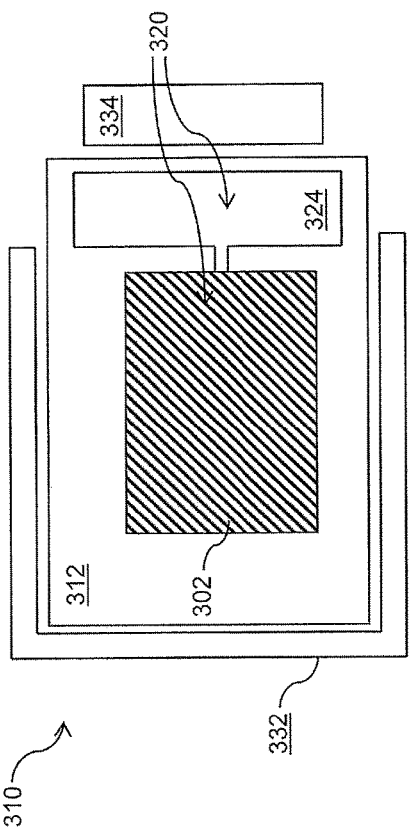
FIG. 3A
FIG. 3B

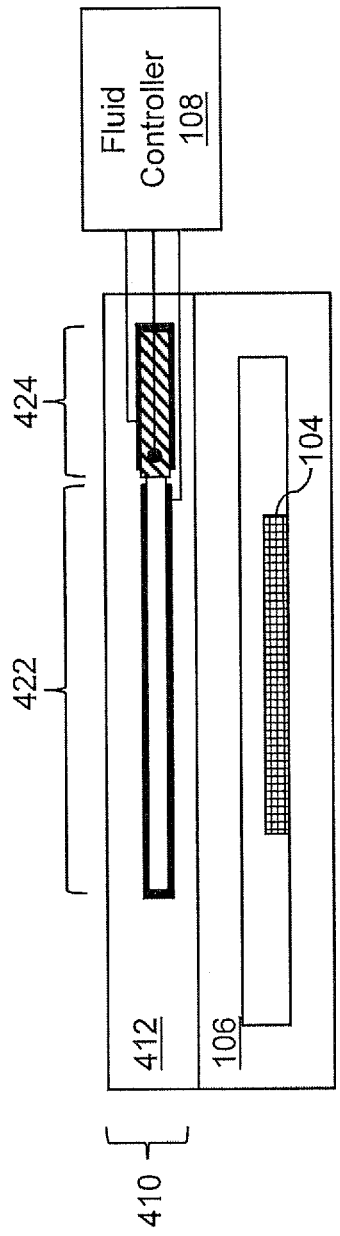
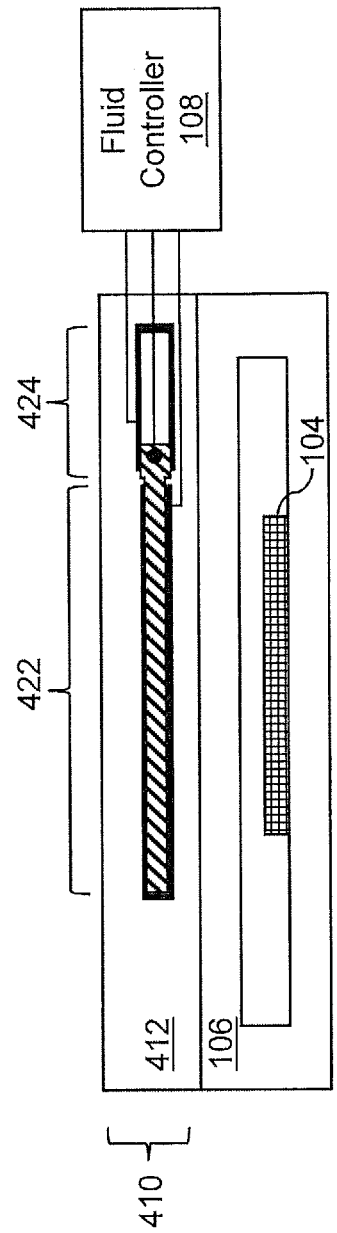
FIG. 4C
FIG. 4D

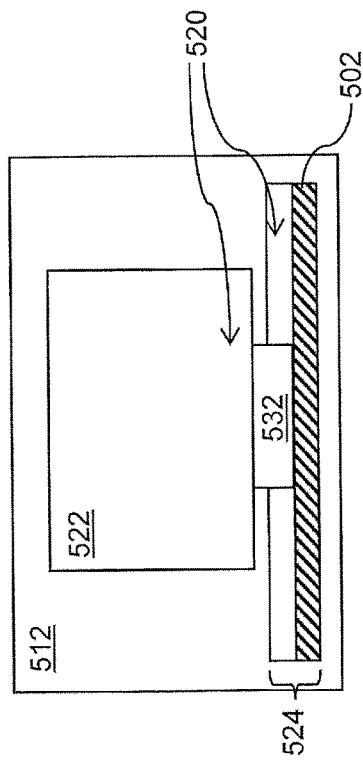
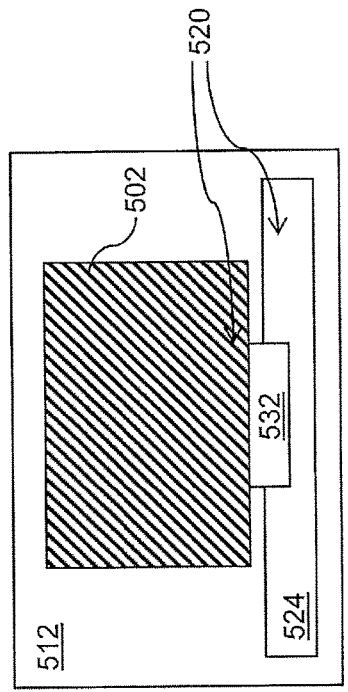

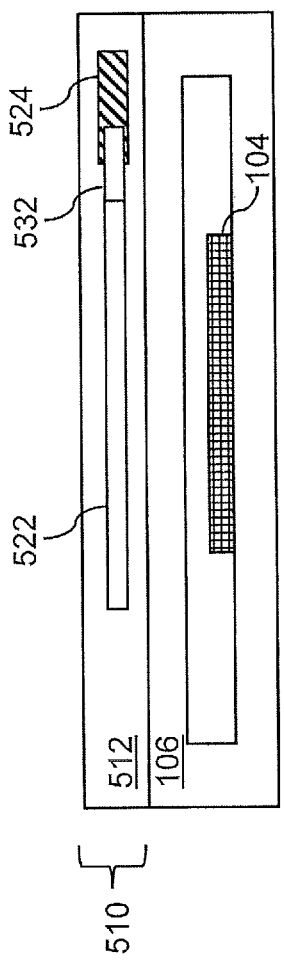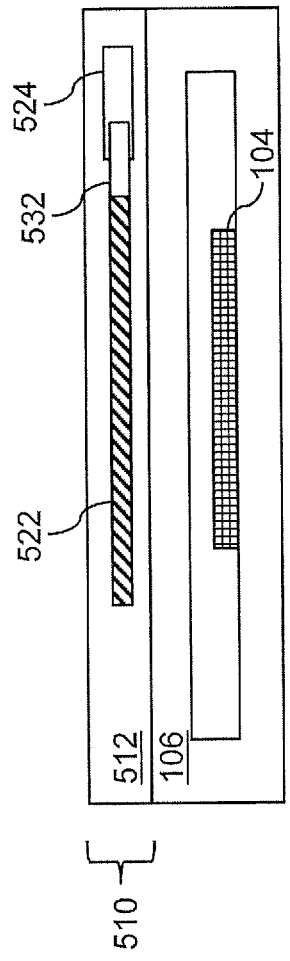
FIG. 5C
FIG. 5D

LIQUID SHUTTER FOR INFRARED IMAGING DEVICES

CROSS-REFERENCE TO RELATED APPLICATIONS

This application is a continuation of International Patent Application No. PCT/US2016/015840 filed Jan. 29, 2016 and entitled "LIQUID SHUTTER FOR INFRARED IMAGING DEVICES," which is incorporated herein by reference in its entirety.

International Patent Application No. PCT/US2016/015840 filed Jan. 29, 2016 claims priority to and the benefit of U.S. Provisional Patent Application No. 62/110,427 filed Jan. 30, 2015 and entitled "Liquid Shutter for Infrared Imaging Devices," which is hereby incorporated by reference in its entirety.

International Patent Application No. PCT/US2016/015840 filed Jan. 29, 2016 claims priority to and the benefit of U.S. Provisional Patent Application No. 62/203,795 filed Aug. 11, 2015 and entitled "Liquid Shutter for Infrared Imaging Devices," which is hereby incorporated by reference in its entirety.

TECHNICAL FIELD

The invention relates generally to imaging devices and, more particularly, to shutters for infrared imaging devices.

BACKGROUND

Focal plane arrays (FPAs) that detect infrared (e.g., thermal) radiation are used by infrared cameras to provide thermal images. For example, thermal radiation passing through an optical path of an infrared camera is received by infrared detectors of the FPA, which provide image data for pixels of thermal images.

The quality of thermal images provided by FPAs may be degraded due to non-uniform responses among the individual infrared detectors to incident infrared radiation. Because the magnitude of the non-uniformity may be large in comparison to the magnitude of the actual response due to the incident infrared radiation, various techniques are typically used to compensate for the non-uniformity and obtain a desirable signal-to-noise ratio.

For example, in some conventional infrared imaging devices, the FPA may be calibrated over one or more levels of photon flux by inserting a mechanical shutter that can selectively be moved into the optical path of the infrared camera. The FPA takes one or more data frames or snapshots of the shutter to calibrate its response, and the collected data may then be used to calibrate the FPA to provide a more uniform response. Such a mechanical shutter may also be found in some non-thermal (e.g., visible light) imaging devices having charge-coupled devices (CCDs) or complementary metal-oxide (CMOS) sensors, for example, for calibration and/or imaging capturing purposes.

However, a mechanical shutter requires a shutter blade (e.g., a shutter paddle), an actuator (e.g., a motor) and an associated drive train to move the shutter blade in and out of the optical path. As such, a mechanical shutter, if integrated into or otherwise provided in an imaging device, may increase the size, complexity, and cost of the imaging device, which is undesirable especially for compact imaging devices. Furthermore, mechanical components such as motors and associated drive trains of mechanical shutters are more prone to wear and tear than solid state components such as a FPA, and thus adversely affect the overall reliability and longevity of imaging devices that rely on mechanical shutters.

SUMMARY

One or more embodiments may be used to provide flat field correction (FFC) for infrared cameras, particularly using a shutter that selectively blocks a focal plane array using a liquid barrier (e.g., a liquid shutter).

In an embodiment, a device includes a focal plane array (FPA) configured to receive infrared radiation (e.g., thermal infrared radiation) from a scene, a liquid shutter housing forming a cavity, a fluid controller, and infrared-opaque liquid disposed within the cavity, wherein the fluid controller is configured to direct the liquid from a reservoir area of the cavity to a field of view (FOV) area of the cavity to block the FPA from the infrared radiation.

In another embodiment, a method includes receiving infrared radiation from a scene at a FPA, and selectively directing, by a fluid controller, infrared-opaque liquid disposed within a cavity of a shutter housing, wherein the fluid controller is adapted to direct the liquid from a reservoir area of the cavity to a FOV area of the cavity to block the FPA from the infrared radiation.

In one example, a liquid shutter uses magnetic fields from electromagnets to move an infrared-opaque liquid, such as ferrofluid, into and out of a field of view area of the liquid shutter. In another example, a liquid shutter uses an electric field and/or an electric potential difference, or other electrowetting technique, to move an infrared-opaque liquid, such as water, into and out of a field of view area of the liquid shutter. In a further example, a liquid shutter uses a pump to move an infrared-opaque liquid into and out of a field of view area of the liquid shutter.

In one or more embodiments, a system includes a housing, a reservoir disposed within the housing and configured to hold a liquid, and a first window including a first conductive layer, and a second window including a second conductive layer and positioned relative to the first window to define a chamber between the first window and the second window, the first conductive layer and second conductive layer configured to receive corresponding voltages to selectively direct the liquid from the reservoir to the chamber. The first window may include a first isolation layer, and the second window may include a second isolation layer, and the first isolation layer and the second isolation layer may be configured to direct the liquid from the chamber to the reservoir.

In some embodiments, the first window and the second window are infrared-transparent, and the system further includes a focal plane array (FPA) configured to capture a thermal image of a scene in response to infrared radiation received through the first window and the second window. In some embodiments, the liquid is infrared-opaque and selectively blocks infrared radiation from the scene while the liquid is disposed in the chamber, and the FPA is configured to capture an image of the liquid. The system may further include a temperature sensor configured to determine the temperature of the liquid and a processor configured to determine flat field correction (FFC) terms and/or radiometric calibration terms based on the thermal image of the scene and/or the temperature.

In one or more embodiments, a method includes applying a voltage across a first window including a first conductive layer and a second window including a second conductive layer, where the first window and the second window define a chamber between the first window and the second window; and directing a liquid from a reservoir disposed within a housing to the chamber. The method may further include interrupting the applying of the voltage; and directing the liquid from the chamber to the reservoir by the first window comprising a first isolation layer and the second window comprising a second isolation layer interacting with the liquid.

In some embodiments, the first window and the second window are infrared-transparent, and the method further includes capturing, by a FPA, a thermal image of a scene in response to infrared radiation received through the first window and the second window. In some embodiments, the liquid is infrared-opaque and selectively blocks infrared radiation from the scene while the liquid is disposed in the chamber, and the method further includes capturing, by the FPA, a thermal image of the liquid. The method may further include determining a temperature of the liquid, and determining FFC terms and radiometric calibration terms based on the thermal image of the scene and/or the temperature.

The scope of the invention is defined by the claims. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 2A-D illustrate an exemplary liquid shutter of an infrared imaging device that utilizes a magnetic field in accordance with an embodiment of the invention.

FIGS. 3A-D illustrate an exemplary liquid shutter of an infrared imaging device that utilizes a magnetic field in accordance with an embodiment of the invention.

FIGS. 4A-D illustrate an exemplary liquid shutter of an infrared imaging device that utilizes an electric field and/or an electric potential difference in accordance with an embodiment of the invention.

FIGS. 5A-D illustrate an exemplary liquid shutter of an infrared imaging device that utilizes a pump in accordance with an embodiment of the invention.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
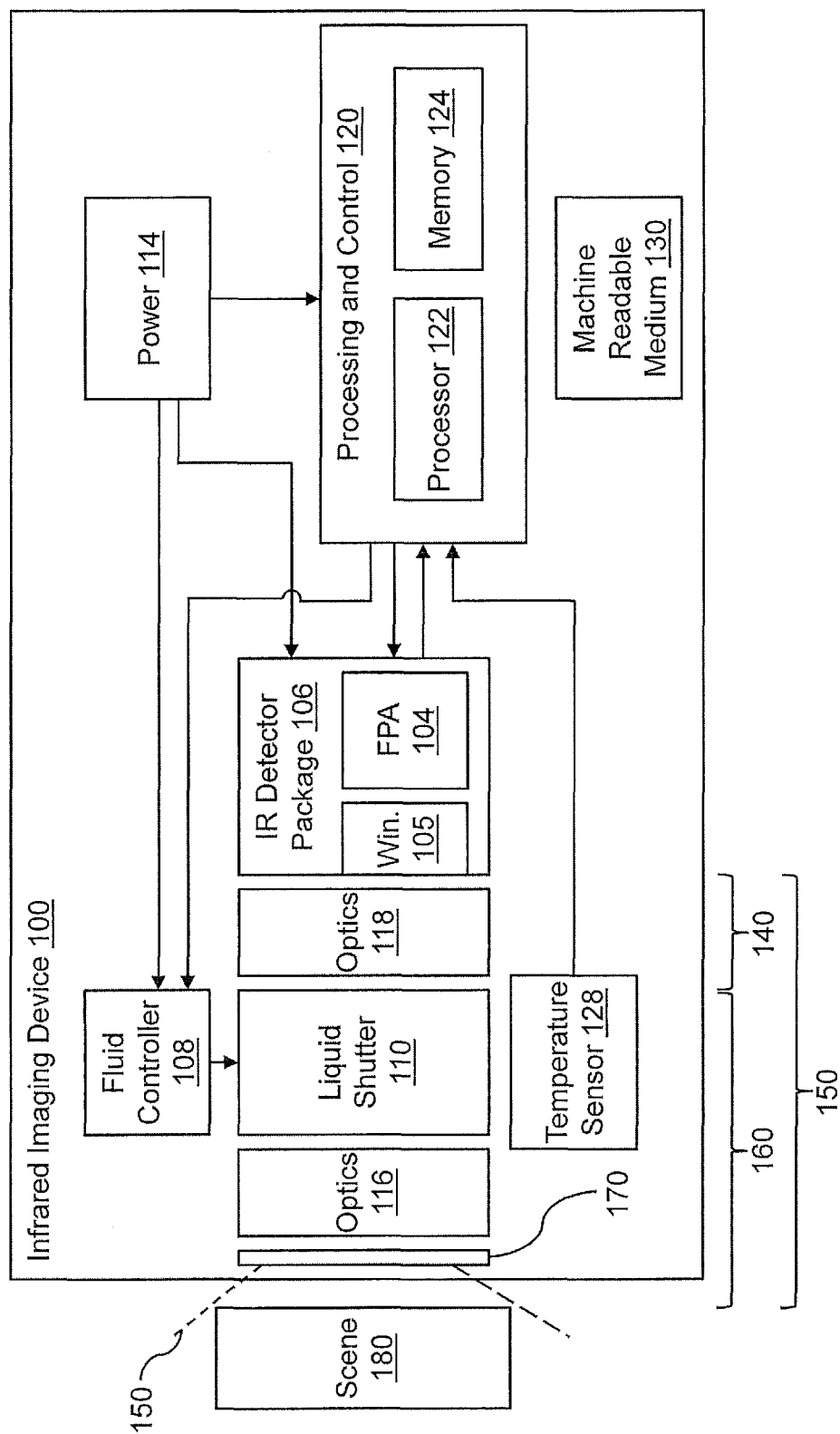
FIG. 1 illustrates an exemplary infrared imaging device including a liquid shutter in accordance with an embodiment of the invention.

FIG. 1 illustrates a block diagram of an infrared (IR) imaging device 100 in accordance with an embodiment of the invention. Infrared imaging device 100 includes an infrared detector package 106, a fluid controller 108, a liquid shutter 110, a temperature sensor 128, optics blocks 116 and 118, and a processing and control block 120. Fluid controller 108 may be a part of or integrated with liquid shutter 110, or may be provided as a separate element.

In one example, infrared imaging device 100 may represent any type of infrared camera or thermal imaging system not limited to any specific embodiment disclosed herein, and may be implemented as desired for particular applications. In this regard, the components illustrated in FIG. 1 may be implemented as a standalone infrared camera in one embodiment, while in another embodiment the components of FIG. 1 may be distributed between a plurality of different devices. Thus, in one example, processing and control block 120 may be implemented in a host device such as a smart phone or other mobile device, with other components of FIG. 1 being implemented in an infrared imaging module that may be coupled to the host device. In another example, processing and control block 120 may be implemented by one or more external computer systems that interface with infrared camera 100 (e.g., over a network or other appropriate communication medium). In some embodiments, infrared camera 100 may be implemented with greater, fewer, and/or different components than those illustrated in FIG. 1 as appropriate for particular applications.

Infrared camera 100 may be configured to capture infrared image data representing infrared radiation from a scene 180. In the illustrated embodiment of FIG. 1, infrared radiation from scene 180 passes along an optical path through optics blocks 116 and 118 to reach infrared detector package 106 (e.g., a vacuum package assembly) when liquid shutter 110 is open as further described herein. Optics blocks 116 and 118 may each be implemented, for example, with a thermalized optics including one or more lenses (e.g., lens elements), and configured to focus the infrared radiation onto a focal plane array (FPA) 104 provided in infrared detector package 106. Although optics blocks 116 and 118 are shown in the embodiment of FIG. 1, optics block 116, 118, or both may be omitted, or combined with liquid shutter 110 or infrared detector package 106, according to various other embodiments.

FPA 104 may be configured to provide infrared image data (e.g., analog or digital signals) representing images of infrared radiation received thereon. FPA 104 may be implemented using any suitable type of infrared detectors (e.g., quantum wells, microbolometers, thermopiles, or other types of detector elements responsive to infrared radiation) that are arranged in a suitable pattern (e.g., a rectangular array, a square array, a one-dimensional array, or other arrangements) as may be desired for particular implementations. FPA 104 may include read-out integrated circuitry (ROIC) configured to generate analog or digital signals corresponding to the intensity of infrared radiation received at each infrared detector of FPA 104, and to interface with other components such as processing and control block 120. Further examples of ROICs and infrared detectors (e.g., microbolometer circuits) may be found in U.S. Pat. No. 6,028,309 issued Feb. 22, 2000, which is incorporated herein by reference in its entirety.

Infrared detector package 106 includes a focal plane array (FPA) 104 to detect infrared radiation passing through a window 105 and provide thermal image data in response thereto.

In one embodiment, infrared detector package 106 and optics block 116 may be sealed inside a chamber including window 170 (e.g., a heated or temperature controlled protective window) positioned between optics block 116 and scene 180.

In another embodiment, one or more lenses of optics block 116 may be selectively inserted into optical path 150. Accordingly, infrared camera 100 may be operated with various lenses (e.g., 25 mm, 35 mm, 50 mm, 140 mm, or others) as may be desired for particular applications. The different types of lenses may contribute to different non-uniformities in the propagation of infrared radiation along optical path 150.

Infrared detector package 106 includes a focal plane array (FPA) 104 to detect infrared radiation passing through a window 105 and provide thermal image data in response thereto. FPA 104 may be implemented using various types of infrared detectors (e.g., quantum wells, microbolometers, or other types) as may be desired for particular implementations.

Liquid shutter 110 includes a cavity containing fluid that is opaque to infrared radiation. The cavity may have multiple areas (e.g., compartments, zones, sections, spaces, etc.) including a reservoir area (e.g., an area that does not include optical path 150) and a field of view area (e.g., an area that includes optical path 150). When the FOV area contains the infrared-opaque fluid, the FOV area may block infrared radiation along optical path 150. The FOV area may have a small thickness, as there are many fluids that are opaque to infrared even with a very small thickness.

Liquid shutter 110 may be selectively activated (e.g., closed, on, in calibration mode, in activated mode, etc.) or deactivated (e.g., open, off, in imaging mode, in deactivated mode, etc.). When liquid shutter 110 is activated, the infrared-opaque fluid in the cavity of the liquid shutter 110 may flow from the reservoir area into the FOV area to facilitate calibration of FPA 104. For example, when liquid shutter 110 is activated, infrared-opaque fluid flows into optical path 150 such that liquid shutter 110 substantially blocks infrared radiation from passing from scene 180 to FPA 104. In this case, FPA 104 instead detects infrared radiation received from liquid shutter 110 including the infrared-opaque fluid along an optical path 140, to the exclusion of infrared radiation received along an optical path 160. In one embodiment, liquid shutter 110 may be implemented to approximate a thermal black body in front of infrared detector package 106 when in its calibration mode. By calibrating FPA 104 to liquid shutter 110 in its calibration mode, flat field correction values may be determined which may be applied to infrared detectors of FPA 104 in order to correct for non-uniformities present in optical path 140, as discussed further herein.

In one embodiment, liquid shutter 110 interfaces to a wafer level package (e.g., infrared detector package 106). The top of the wafer level package could serve as the bottom of the enclosure of liquid shutter 110. A structure may be constructed to house a cavity for containing the infrared-opaque liquid.

In another embodiment, with the emergence of wafer level packaging for bolometers and the technical feasibility of wafer level optics, liquid shutters 110 may be included in infrared cameras 100 without the need to add additional optical interfaces. This has the advantage of reducing optical signal attenuation and possibly in reducing the cost of the shutter. Liquid shutter 110 may be integrated into a wafer level package (e.g., infrared detector package 106). Lens designs utilizing wafer level packaging may include at least two lens elements separated by an air gap. This air gap in between elements could be used as the space required to contain the infrared-opaque liquid. This is generally applicable to any optical fabrication method, but may be even more attractive for wafer level optical designs where the lenses are assembled at the wafer level with two wafers and a spacer in-between and that are stack bonded together. The bonding process offers an opportunity to capture the infrared-opaque liquid and an infrared-transparent gas or liquid at the wafer level as part of the assembly process.

Power block 114 may include a circuit board power subsystem (e.g., a power board) for infrared camera 100. For example, power block 114 may provide various power conversion operations and desired power supply voltages, control voltages, power on-off switching, and various other operations (e.g., a fluid controller 108), including an interface to a battery or external power supply, as would be understood by one skilled in the art.

Processing and control block 120 includes a processor 122 and a memory 124. Processor 122 may be configured with appropriate software (e.g., one or more computer programs for execution by processor 122) stored on a machine readable medium 130 (e.g., a CD-ROM or other appropriate medium) and/or in memory 124 to instruct processor 122 to perform one or more of the operations described herein. Processor 122 and memory 124 may be implemented in accordance with any desired combination of one or more processors and/or one or more memories as desired for particular implementations.

Processing and control block 120 receives thermal image data captured by infrared detectors of FPA 104 and processes the thermal image data to perform a flat field correction on the data to account for non-uniformities associated with the infrared detectors of FPA 104 and other non-uniformities associated with other portions of optical path 150 (e.g., non-uniformities associated with optics block 116 or other portions of infrared camera 100). The corrected thermal image data may be used to provide corrected thermal images which account for aberrations in optical path 150.

Processing and control block 120 also interfaces with fluid controller 108 to control the liquid shutter 110. Advantageously, processing and control block 120 may receive thermal image data captured by FPA 104 either while liquid shutter 110 is activated, in which infrared-opaque fluid is inserted into optical path 150 or while liquid shutter 110 is deactivated, in which infrared-opaque fluid is removed from optical path 150. As a result, processing and control block 120 may selectively calibrate FPA 104 along either optical path 140 (e.g., while infrared-opaque fluid is inserted into optical path 150) or optical path 150 (e.g., infrared-opaque fluid is removed from optical path 150). For example, in one embodiment, processing and control block 120 may determine flat field correction values (e.g., gain and offset values) associated with individual infrared detectors of FPA 104 to correct for non-uniformities associated with the infrared detectors for either optical path 140 or optical path 150. As further described herein, the flat field correction values may be further processed to determine supplemental flat field correction values to correct for non-uniformities associated with the infrared detectors for optical path 160.

Processing and control block 120 also interfaces with temperature sensor 128 to determine a temperature and a rate of temperature change of the ambient environment in which infrared camera 100 is positioned and/or one or more components of infrared camera 100 (e.g., FPA 104, infrared detector package 106, fluid controller 108, liquid shutter 110 and/or the infrared-opaque fluid therein, power block 114, optics block 116 and/or 118, processing and control block 120, window 170, and/or other components). Processing and control block 120 may be configured to scale the supplemental flat field correction values based on temperature readings obtained from temperature sensor 128.

Temperature sensor 128 may be positioned in any desired location of infrared camera 100 (e.g., optics block 116 and/or 118, FPA 104, fluid controller 108, near optical path 150 such as shutter 110 and/or window 170, and/or other locations of infrared camera 100) and/or in the ambient environment in which infrared camera 100 is positioned. For example, in one embodiment, temperature sensor 128 is positioned on FPA 104 and window 170. In another embodiment, temperature sensor 128 is positioned within, coupled to, adjacent to, or otherwise relative to liquid shutter 110 so that, for example, temperature of the infrared-opaque liquid may be measured or approximated.

Processing and control block 120 may receive thermal image data captured by infrared detectors of FPA 104 and temperature data measured by temperature sensor 128 of liquid shutter 110 while liquid shutter 110 is in its active state and processes the thermal image data and the temperature data to perform radiometric calibration. For example, processing and control block 120 may perform radiometric calibration to provide reference radiometric data that may be used for determining accurate surface temperature of, for example, objects in scene 180.

FIGS. 2A-D illustrate an exemplary liquid shutter 210 of an infrared imaging device, such as infrared camera 100 of FIG. 1, that utilizes a magnetic field to move an infrared-opaque liquid 202 in accordance with an embodiment of the invention.

In an embodiment, liquid shutter 210 includes a liquid shutter housing, such as a liquid container 212 (e.g., a housing) with a cavity 220 having multiple areas (e.g., compartments, zones, sections, spaces, etc.), such as a FOV area 222 and a reservoir area 224. FOV area is located in front of FPA 104, as shown in FIGS. 2C and 2D. An electromagnet 232 (e.g., a miniature electromagnet) is positioned on a side of liquid container 212 that is closer to FOV area 222 than reservoir area 224, and an electromagnet 234 (e.g., a miniature electromagnet) is positioned on a side of liquid container that is closer to reservoir area 224 than FOV area 222. For example, if FOV area 222 is above reservoir area 224, electromagnet 232 is above liquid container 212 and electromagnet 234 is below liquid container 212.

In some embodiments, liquid container 212 may be a double-layered container (e.g., a miniature container) constructed out of infrared-transparent materials (e.g. silicon, germanium, zinc selenide, or other non-hydroscopic infrared-transmissive material). One or more layers of liquid container 212 may be a wafer level package (WLP) window.

In some embodiments, liquid 202 may be ferrofluid (ferromagnetic fluid), magneto-rheological fluid, smart fluid, or other fluid responsive to magnetic fields (e.g., subject to being moved or changing properties such as viscosity, opacity, or other properties). For example, ferrofluid may be a colloidal suspension of nanosized ferromagnetic particles. In some embodiments, liquid 202 may be suspended in an infrared-transparent fluid or gas. The composition of the ferrofluid is well suited to act as an optically opaque medium. The application of an appropriate magnetic field moves the ferrofluid into or out of the field of view of FPA, such as FPA 104 (e.g., between reservoir area 224 and FOV area 222.)

In an embodiment, a thin layer of liquid 202 is moved in and out of FOV area 222 by applying a magnetic field using electromagnets 232 and/or 234 to perform flat field correction. A fluid controller, such as fluid controller 108 of FIG. 1, may be configured to control the current through electromagnets 232, 234 for fluid control.

FIG. 2A shows a front-side view of liquid shutter 210 in imaging mode, and FIG. 2C shows a cross-sectional view of liquid shutter 210 in imaging mode. As shown in FIGS. 2A and 2C, liquid 202 is in reservoir area 224 such that liquid 202 does not block the field of view of FPA 104. In imaging mode of liquid shutter 210, electromagnet 232 may be inactive and electromagnet 234 may be active. For example, fluid controller 108 provides no current through electromagnet 232 and provides a current through 234 such that electromagnet 232 does not produce a magnetic field and electromagnet 234 produces a magnetic field. Liquid 202 is in reservoir area 224 because liquid 202 is attracted by the magnetic field generated by electromagnet 234 and/or by gravity. Accordingly, referring back to FIG. 1, infrared light from scene 180 may travel through optical path 160.

FIG. 2B shows a front-side view of liquid shutter 210 in calibration mode, and FIG. 2D shows a cross-sectional view of liquid shutter 210 in calibration mode. As shown in FIGS. 2B and 2D, liquid 202 is in FOV area 222 such that liquid 202 blocks the field of view of FPA 104. In the calibration mode, electromagnet 232 may be active and electromagnet 234 may be inactive. For example, fluid controller 108 provides a current through electromagnet 232 and provides no current through 234 such that electromagnet 232 produces a magnetic field and electromagnet 234 does not produce a magnetic field. Liquid 202 is in FOV area 222 because liquid 202 is attracted by the magnetic field generated by electromagnet 232. Accordingly, referring back to FIG. 1, infrared light from scene 180 is blocked from traveling optical path 160.

In some embodiments, tilt/orientation sensors may also be utilized (e.g., if infrared camera is upside down, the electromagnet to activate for the imaging mode and the electromagnet to activate for the calibration mode may be switched.)

Advantageously, liquid shutter 210 has no moving parts, so the cost and size of an infrared camera with such a shutter, such as infrared camera 100, may be greatly reduced. Further, the reliability of infrared camera 100 may be significantly improved.

FIGS. 3A-D illustrate an exemplary liquid shutter 310 of an infrared imaging device, such as infrared camera 100 of FIG. 1, that utilizes a magnetic field to move an infrared-opaque liquid 302 in accordance with an embodiment of the invention. In some embodiments, liquid shutter 310 operates similar to liquid shutter 210, but with a differently shaped configuration.

Figure 3C:
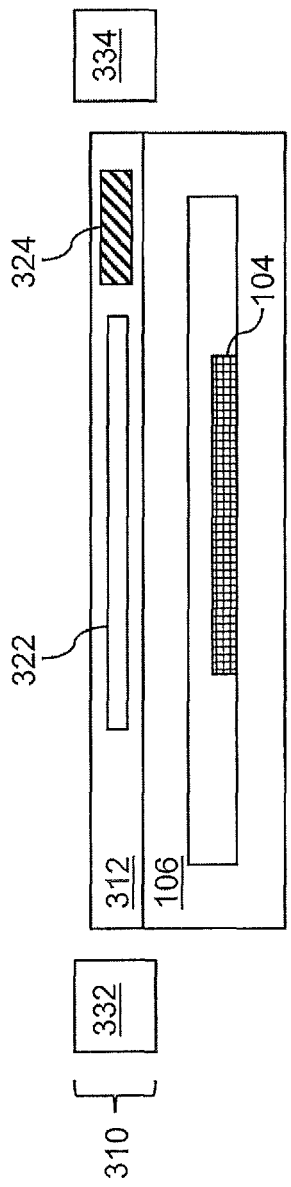
Figure 3D:
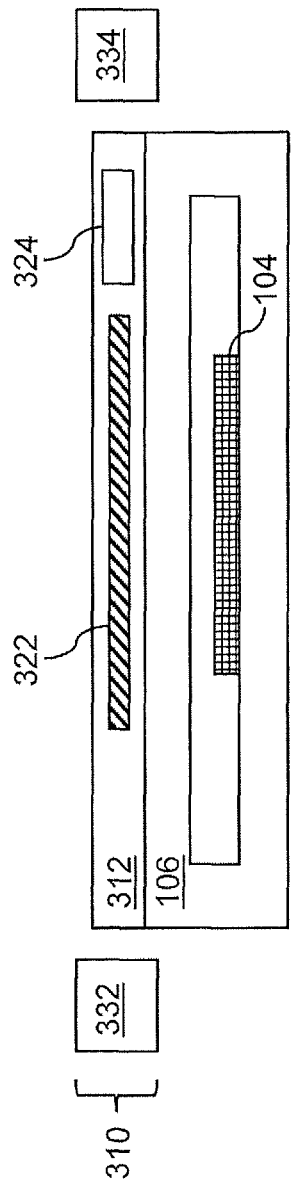

In an embodiment, liquid shutter 310 includes a liquid shutter housing, such as a liquid container 312, with a cavity 320 having multiple areas (e.g., compartments, zones, sections, spaces, etc.), such as a FOV area 322 and a reservoir area 324. FOV area is located in front of FPA 104, as shown in FIGS. 3C and 3D. An electromagnet 332 (e.g., a miniature electromagnet) is positioned on a side of liquid container 312 (e.g., a housing) that is closer to FOV area 222 than reservoir area 324, and an electromagnet 334 (e.g., a miniature electromagnet) is positioned on a side of liquid container that is closer to reservoir area 324 than FOV area 322. For example, if FOV area 322 is to the left of reservoir area 324, electromagnet 332 is to the left of liquid container 312, and electromagnet 334 is to the right of liquid container 312. If FOV area 322 is to the right of reservoir area 324, electromagnet 332 is to the right of liquid container 312, and electromagnet 334 is to the left of liquid container 312.

In some embodiments, liquid container 312 may be a double-layered container (e.g., a miniature container) constructed out of infrared-transparent materials (e.g. silicon, germanium, zinc selenide, or other non-hydroscopic infrared-transmissive material). One or more layers of liquid container 312 may be a wafer level package (WLP) window. In some embodiments, liquid 302 may be implemented in the manner of liquid 202.

In an embodiment, a thin layer of liquid 302 is moved in and out of FOV area 322 by applying a magnetic field using electromagnets 332 and/or 334 to perform flat field correction. A fluid controller, such as fluid controller 108 of FIG. 1, may be configured to control the current through electromagnets 332, 334 for fluid control.

FIG. 3A shows a front-side view of liquid shutter 310 in imaging mode, and FIG. 3C shows a cross-sectional view of liquid shutter 310 in imaging mode. As shown in FIGS. 3A and 3C, liquid 302 is in reservoir area 324 such that liquid 302 does not block the field of view of FPA 104. In imaging mode of liquid shutter 310, electromagnet 332 may be inactive and electromagnet 334 may be active. For example, fluid controller 108 provides no current through electromagnet 332 and provides a current through 334 such that electromagnet 332 does not produce a magnetic field and electromagnet 334 produces a magnetic field. Liquid 202 is in reservoir area 324 because liquid 302 is attracted by the magnetic field generated by electromagnet 234. Accordingly, referring back to FIG. 1, infrared light from scene 180 may travel through optical path 160.

FIG. 3B shows a front-side view of liquid shutter 310 in calibration mode, and FIG. 3D shows a cross-sectional view of liquid shutter 310 in calibration mode. As shown in FIGS. 3B and 3D, liquid 302 is in FOV area 322 such that liquid 302 blocks the field of view of FPA 104. In the calibration mode, electromagnet 332 may be active and electromagnet 334 may be inactive. For example, fluid controller 108 provides a current through electromagnet 332 and provides no current through 334 such that electromagnet 332 produces a magnetic field and electromagnet 334 does not produce a magnetic field. Liquid 302 is in FOV area 322 because liquid 302 is attracted by the magnetic field generated by electromagnet 332. Accordingly, referring back to FIG. 1, infrared light from scene 180 is blocked from traveling optical path 160.

In some embodiments, tilt/orientation sensors may also be utilized (e.g., if infrared camera is tilted to one side, the current provided to electromagnet 332 and/or 334 may be increased or decreased, for example, to compensate and take into account gravity.)

Advantageously, liquid shutter 310 has no moving parts, so the cost and size of an infrared camera with such a shutter, such as infrared camera 100, may be greatly reduced. Further, the reliability of infrared camera 100 may be significantly improved.

FIGS. 4A-D illustrate an exemplary liquid shutter 410 of an infrared imaging device, such as infrared camera 100 of FIG. 1, that utilizes an electric field and/or an electric potential difference to move an infrared-opaque liquid 402 in accordance with an embodiment of the invention. In various embodiments, one or more electrowetting techniques known in the art may be implemented to move liquid 402.

In an embodiment, liquid shutter 410 includes a liquid shutter housing, such as a liquid container 412, with a cavity 420 having multiple areas (e.g., compartments, zones, sections, spaces, etc.), such as a FOV area 422 and a reservoir area 424. FOV area is located in front of FPA 104, as shown in FIGS. 4C and 4D.

In some embodiments, liquid container 412 may be a double-layered container (e.g., a miniature container) constructed out of infrared-transparent materials (e.g. silicon, germanium, zinc selenide, or other non-hydroscopic infrared-transmissive material). One or more layers of liquid container 412 may be a wafer level package (WLP) window.

The surface of liquid container 412 facing the cavity 420 (the inside surface) includes a thin film stack 431 containing a hydrophobic material, such as a flouropolymer. Electrodes 432 and 434 (e.g., an electrode plate or layer) are transparent in the infrared wavelength region, or a part of the infrared wavelength region (e.g., long-wave infrared (LWIR) region), and electrically conductive. Although indium-tin oxide is a commonly used transparent electrode in visible systems, indium-tin may not work for LWIR imaging devices. Electrodes 432, 434 may be made of, for example, CdO or, if silicon is used for liquid container 412, a thin layer of doped silicon. A common electrode 436 is located within the cavity at, next to, or adjacent to the boundary between FOV area 422 and a reservoir area 424.

In some embodiments, liquid 402 may be water, other hydrogen-bonding fluid, a polar fluid, water with one or more additives to aid in infrared absorption, or other infrared-opaque liquid that responds to an electric field and/or a difference in electric potential (e.g., move, change properties such as viscosity, opacity, or other property, etc.). Cavity 420 may also include infrared-transparent liquid or gas, such as oil or air, to fill cavity 420 not occupied by liquid 402.

In an embodiment, a thin layer of liquid 402 is moved in and out of FOV area 422 by applying a voltage in one of the transparent electrodes, either electrode 432 or 434, and common electrode 436, to perform flat field correction. By applying the voltage, the surface tension of liquid 402 against the hydrophobic surface can be altered. The alteration of the surface tension results in movement of the water into and out of the field of view of FPA, such as FPA 104. A fluid controller, such as fluid controller 108, may include a switch and may be configured to control the applied voltage by applying a voltage across electrodes 432 and 436, or by applying a voltage across electrodes 434 and 436, for fluid control.

Figure 4A:
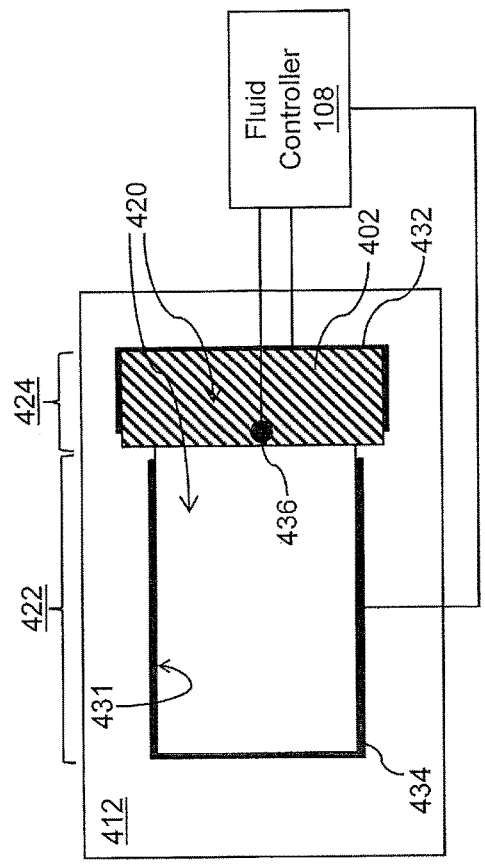

FIG. 4A shows a front-side view of liquid shutter 410 in imaging mode, and FIG. 4C shows a cross-sectional view of liquid shutter 410 in imaging mode. As shown in FIGS. 4A and 4C, liquid 402 is in reservoir area 424 such that liquid 402 does not block the field of view of FPA 104. In imaging mode of liquid shutter 410, fluid controller 108 may apply a voltage across electrode 432 and 436 to generate charged surfaces on electrodes 432 and 436. All or most of liquid 402 may move to reservoir area 424, and all or most of FOV area 422 may be filled with the infrared-transparent liquid or gas. Since the infrared-transparent liquid or gas does not attenuate the infrared signal, referring back to FIG. 1, infrared light from scene 180 may travel through optical path 160.

Figure 4B:
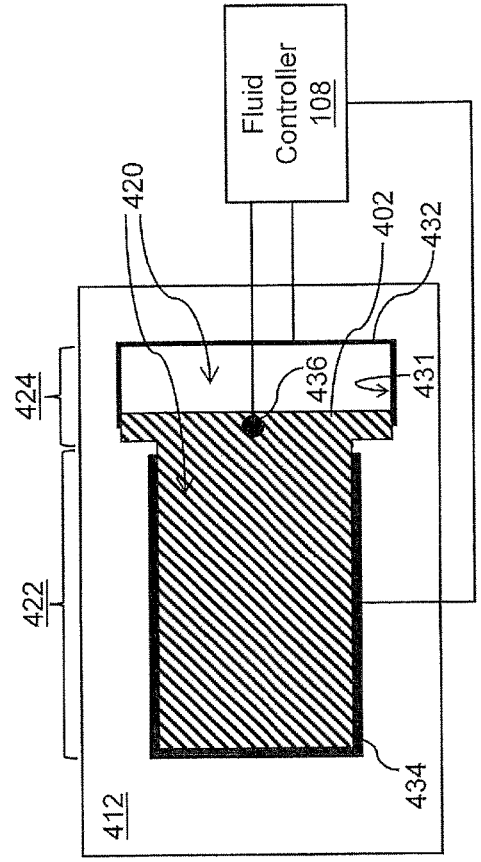

FIG. 4B shows a front-side view of liquid shutter 410 in calibration mode, and FIG. 4D shows a cross-sectional view of liquid shutter 410 in calibration mode. As shown in FIGS. 4B and 4D, liquid 402 is in FOV area 422 such that liquid 402 blocks the field of view of FPA 104. In calibration mode of liquid shutter 410, fluid controller 108 may apply a voltage across electrode 434 and 436 to generate charged surfaces on electrodes 434 and 436. All or most of liquid 402 may move to FOV area 422, and all or most of reservoir area 424 may be filled with the infrared-transparent liquid or gas. Since liquid 402 that highly absorbs infrared light (e.g., water) is used, referring back to FIG. 1, moving liquid 402 into the field of view will cut off infrared light traveling optical path 160 from scene 180.

In some embodiments, tilt/orientation sensors may also be utilized (e.g., if infrared camera is tilted to one side, the voltage applied may be increased or decreased, for example, to compensate and take into account gravity).

Advantageously, liquid shutter 410 has no moving parts, so the cost and size of an infrared camera with such a shutter, such as infrared camera 100, may be greatly reduced. Further, the reliability of infrared camera 100 may be significantly improved.

In some embodiments, liquid container 412 may have a structure that, while in imaging mode, provides the liquid container 412 and infrared-transparent gas or liquid with optic properties. While in imaging mode, liquid container 412 and infrared-transparent gas or liquid may act as an additional lens element. In other embodiments, liquid container 412 has a structure with flat surfaces and acts as a shutter but not a lens with optical power.

FIGS. 5A-D illustrate an exemplary liquid shutter 510 of an infrared imaging device, such as infrared camera 100 of FIG. 1, that utilizes a pump 532 (e.g., a miniature pump, micropump, a microelectromechanical systems (MEMS) pump, a membrane pump, or other pump) to move an infrared-opaque liquid 502 in accordance with an embodiment of the invention.

In an embodiment, liquid shutter 510 includes a liquid shutter housing, such as a liquid container 512, with a cavity 520 having multiple areas (e.g., compartments, zones, sections, spaces, etc.), such as a FOV area 522 and a reservoir area 524. FOV area is located in front of FPA 104, as shown in FIGS. 5C and 5D. A pump 532 is configured to displace liquid 502 from reservoir area 524 to FOV area 522, and displace liquid 502 from FOV area 522 to reservoir area 524.

In some embodiments, liquid container 512 may be a double-layered container (e.g., a miniature container) constructed out of infrared-transparent materials (e.g. silicon, germanium, zinc selenide, or other non-hydroscopic infrared-transmissive material). One or more layers of liquid container 512 may be a wafer level package (WLP) window.

In an embodiment, cavity 522 may include liquid 502 that is infrared-opaque, and an infrared-transparent gas. A thin layer of liquid 502 is pumped in and out of FOV area 522 by pump 532 to perform flat field correction.

FIG. 5A shows a front-side view of liquid shutter 510 in imaging mode, and FIG. 5C shows a cross-sectional view of liquid shutter 510 in imaging mode. As shown in FIGS. 5A and 5C, liquid 202 is in reservoir area 524 such that liquid 502 does not block the field of view of FPA 104. In an embodiment, in imaging mode of liquid shutter 510, pump 532 may be inactive. For example, fluid controller 108 may not activate pump 532. Liquid 502 may be pulled into reservoir area 534 and remain in reservoir area 534 by gravity. In another embodiment, pump 532 may actively pump liquid 502 from FOV area 522 to reservoir area 524. While liquid shutter 510 is in imaging mode, referring back to FIG. 1, infrared light from scene 180 may travel through optical path 160.

FIG. 5B shows a front-side view of liquid shutter 510 in calibration mode, and FIG. 5D shows a cross-sectional view of liquid shutter 510 in calibration mode. As shown in FIGS. 5B and 5D, liquid 502 is in FOV area 522 such that liquid 502 blocks the field of view of FPA 104. In an embodiment, in calibration mode of liquid shutter 510, pump 532 may be active. For example, fluid controller 108 may activate pump 532 to pump liquid 502 from reservoir area 524 to FOV area 522. While liquid shutter 510 is in calibration mode, referring back to FIG. 1, infrared light from scene 180 is blocked from traveling optical path 160. In some embodiments, tilt/orientation sensors may also be utilized.

Advantageously, liquid shutter 510 has no moving parts, so the cost and size of an infrared camera with such a shutter, such as infrared camera 100, may be greatly reduced. Further, the reliability of infrared camera 100 may be significantly improved.

Figure 6:
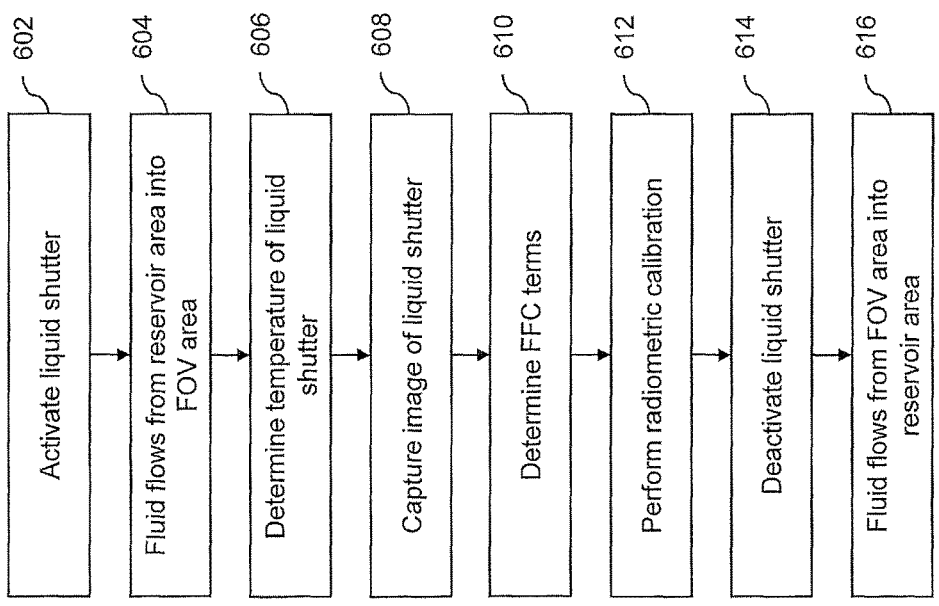
FIG. 6 illustrates a method of calibrating an infrared imaging device using a liquid shutter in accordance with an embodiment of the invention.

FIG. 6 illustrates a method 600 of calibrating an infrared imaging device using a liquid shutter in accordance with an embodiment of the invention.

At block 602, a liquid shutter, such as liquid shutter 110, 210, 310, 410, and/or 510 is activated (e.g., closed, on, in calibration mode, in activated mode, etc.). In an embodiment, a processing and control component, such as processing and control 120, is configured to operate a fluid controller, such as fluid controller 108. Fluid controller 108 may receive signals from processing and control 120 indicating to activate the liquid shutter by place liquid shutter in calibration mode.

At block 604, an infrared-opaque liquid (e.g., liquid 202, 302, 402, and/or 502) flows from reservoir area (e.g., reservoir area 224, 324, 424, and/or 524) to FOV area (e.g., FOV area 222, 322, 422, and/or 522) in response to fluid controller 108 configuring the liquid shutter to be in calibration mode.

At block 606, a temperature sensor, such as temperature sensor 128, determines a temperature of the liquid shutter and/or the infrared-opaque liquid.

At block 608, an infrared image is captured by a FPA, such as FPA 104.

At block 610, processing and control component 120 may determine FFC terms to calibrate infrared camera 100 as described in U.S. Pat. No. 8,373,757, issued Feb. 12, 2013, and U.S. Patent Application Publication No. 2013/0147966, published Jun. 13, 2013, all of which are incorporated by reference in their entirety.

At block 612, processing and control component 120 may perform radiometric calibration. In certain embodiments, block 612 may be omitted.

At block 614, the liquid shutter is deactivated. In an embodiment, fluid controller 108 may receive signals from processing and control 120 indicating to deactivate the liquid shutter by place liquid shutter in imaging mode.

At block 616, the infrared-opaque liquid flows from the FOV area to the reservoir area in response to fluid controller 108 configuring the liquid shutter to be in imaging mode. Thereafter, FPA 104 may operate to capture thermal images of scene 180. The method of FIG. 6 may be repeated as desired.

Figure 7A:
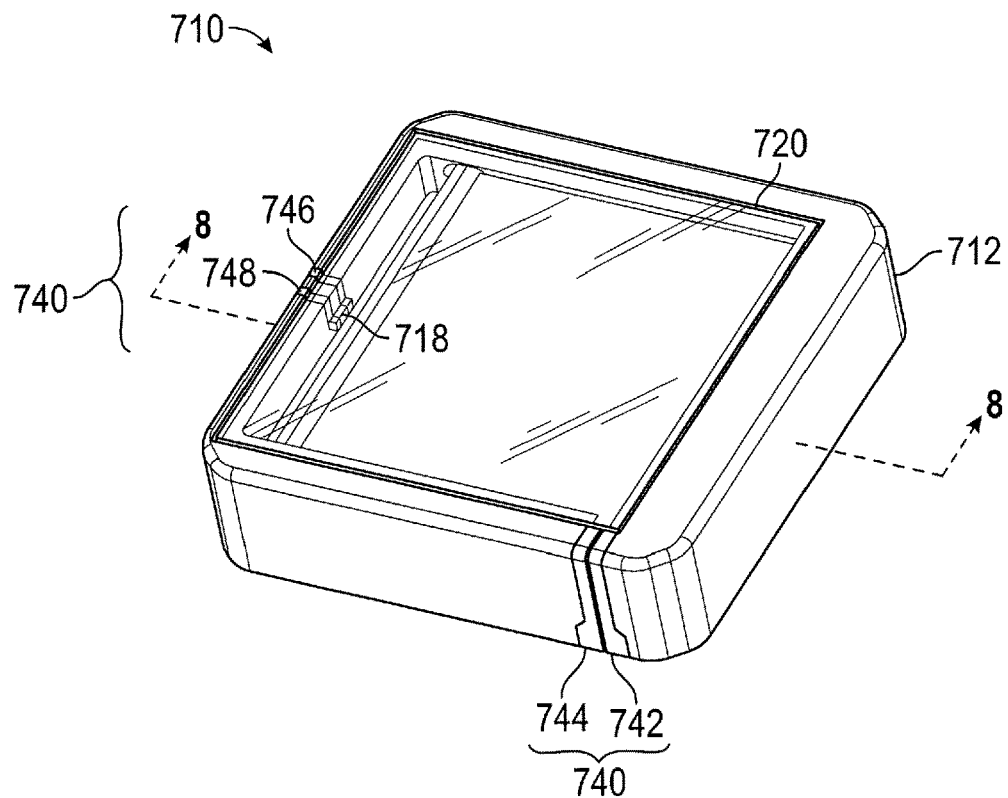
FIGS. 7A-C illustrate various views of another exemplary liquid shutter of an infrared imaging device that utilizes an electric field and/or an electric potential difference in accordance with an embodiment of the invention.
Figure 7B:
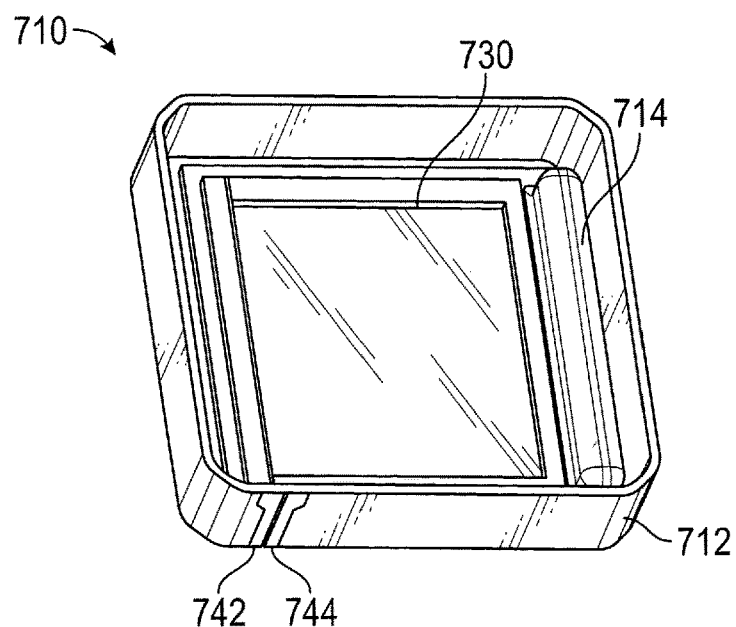
Figure 7C:
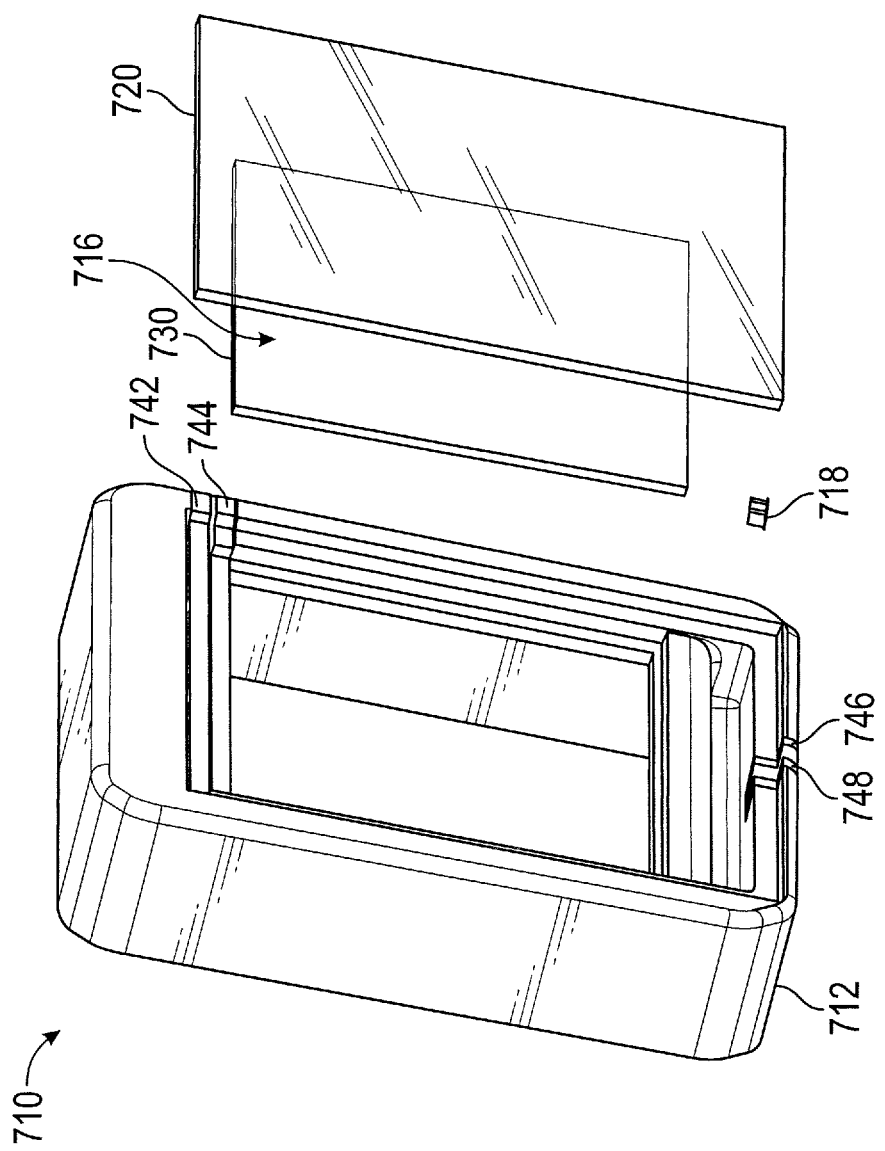

Additional embodiments are also contemplated. For example, FIGS. 7A-C illustrate various views of an exemplary liquid shutter 710 of an infrared imaging device (e.g., an infrared imaging system) that utilizes an electric field and/or an electric potential difference in accordance with an embodiment of the invention. For example, in some embodiments, liquid shutter 710 may be used to implement liquid shutter 110 of infrared camera 100 of FIG. 1. In this regard, liquid shutter 710 may utilize a voltage (also referred to as an electric potential difference), electric charges, and/or an electric field to move a liquid such as liquid 702 (shown in FIGS. 8A-B) to selectively block FPA 104 from receiving infrared radiation from scene 180. More specifically, FIG. 7A shows a perspective top view of liquid shutter 710, FIG. 7B shows a perspective bottom view of liquid shutter 710, and FIG. 7C shows an explored view of liquid shutter 710.

As shown in FIGS. 7A-C, liquid shutter 710 includes a liquid shutter housing 712, a reservoir 714 disposed within housing 712 and configured to hold liquid 702, a window 720, and a window 730. Window 720 and window 730 are positioned relative to each other to define a chamber 716 between window 720 and window 730. Reservoir 714 may define a space for holding liquid 702 and together with chamber 716 may form a single cavity (e.g., in the manner of various cavities discussed herein for other embodiments). Liquid shutter 710 may also include a temperature sensor, such as a thermistor 718 disposed in reservoir 714, configured to measure a temperature of liquid 702. Further, conductive traces and/or wires 740 may be provided on housing 712. Reservoir 714 may be integrated with housing 712 or provided as a separate component. In some embodiments, housing 712 is a molded interconnect device (MID) that includes reservoir 714 and conductive traces 740, such as conductive traces 742, 744, 746, and/or 748.

Figure 8A:
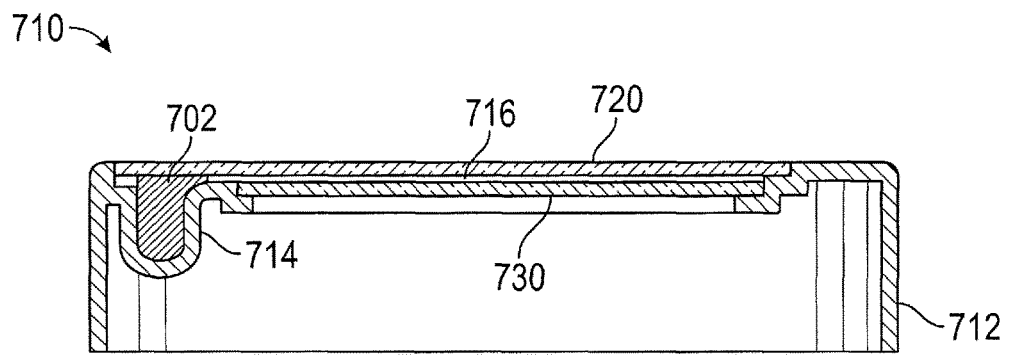
FIGS. 8A-B illustrate cross-sectional views of the liquid shutter of FIGS. 7A-C taken along line 8-8 of FIG. 7A in accordance with an embodiment of the invention.
Figure 8B:
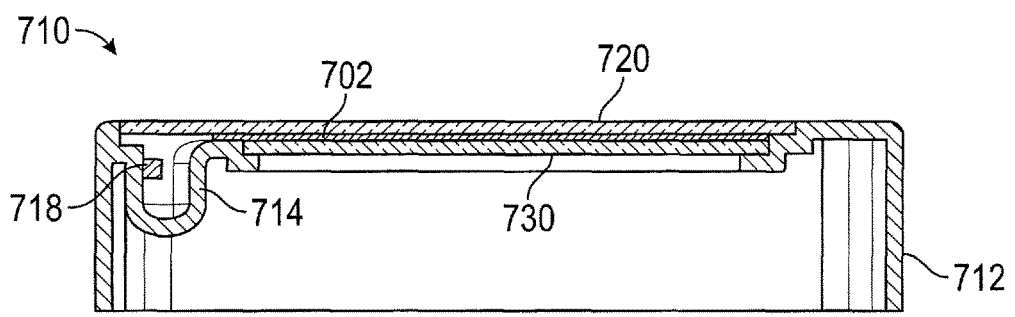

FIGS. 8A-B illustrate cross-sectional views of liquid shutter 710 of FIGS. 7A-C taken along line 8-8 of FIG. 7A in accordance with an embodiment of the invention. In particular, FIG. 8A shows liquid shutter 710 configured in an imaging mode, and FIG. 8B shows liquid shutter 710 configured in a calibration mode, as further discussed herein.

As shown in FIG. 8A, while liquid shutter 710 is in imaging mode, liquid 702 is disposed in reservoir 714. Window 720 and window 730 may be infrared-transparent (e.g., transparent in the infrared wavelength region or a part of the infrared wavelength region such as LWIR region), and infrared radiation received from scene 180 may pass through window 720 and window 730.

As shown in FIG. 8B, while liquid shutter 710 is in calibration mode, liquid 702 is disposed in chamber 716. Liquid 702 may be an infrared-opaque liquid and may effectively operate as a liquid shutter (e.g., a liquid barrier) that selectively blocks infrared radiation from scene 180.

Figure 9:
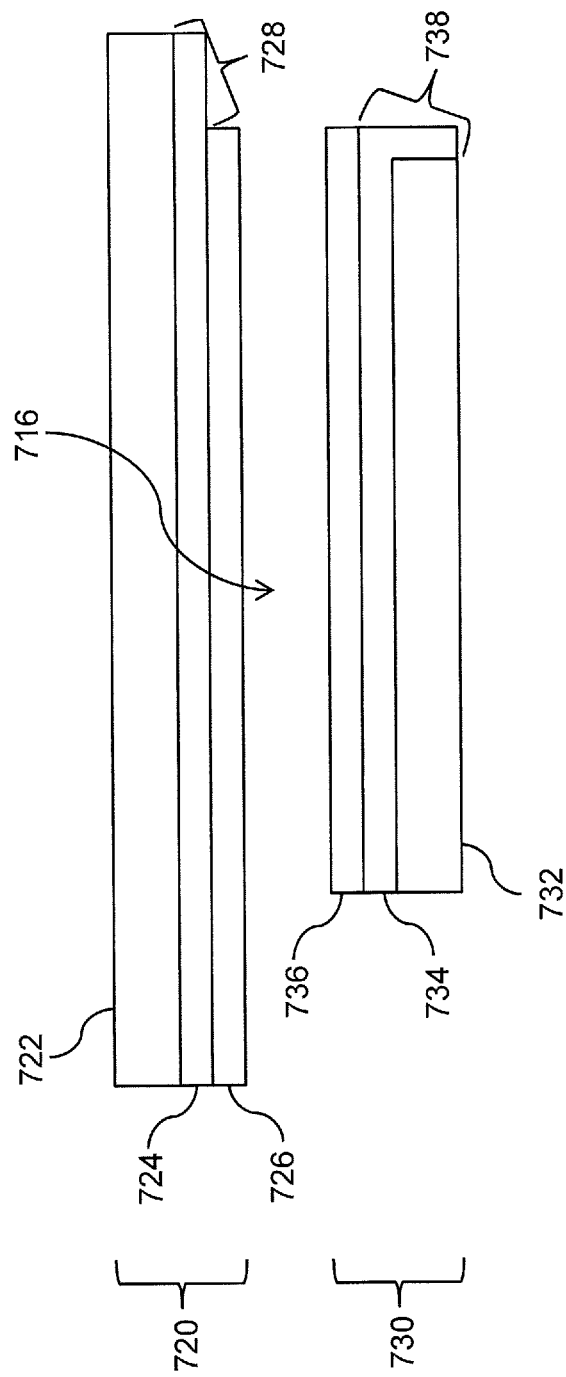
FIG. 9 illustrates further details of the cross-sectional view of FIG. 8A in accordance with an embodiment of the invention.

FIG. 9 illustrates further details of the cross-sectional view of FIG. 8A in accordance with an embodiment of the invention. As shown in FIG. 9, window 720 may include an infrared-transmissive layer 722, a conductive layer 724, and an isolation layer 726. Infrared-transmissive layer 722 may include one or more infrared-transparent materials (e.g. silicon, germanium, zinc selenide, or other non-hydroscopic infrared-transmissive materials). Conductive layer 724 may include nanowires, such as silver nanowires. Alternatively, or in addition, conductive layer 724 may include an infrared-transparent conductive coating (e.g., CdO, doped silicon, or other conductive coating). Isolation layer 726 may include a dielectric and hydrophobic coating (e.g., flouropolymer or other hydrophobic coating) on the side of window 720 facing chamber 716. Conductive layer 724 may be disposed between infrared-transmissive layer 722 and isolation layer 726 except at an exposed area 728 where conductive layer 724 is not covered by isolation layer 726. For example, exposed area 728 may be an edge of window 720.

Window 730 may include an infrared-transmissive layer 732, a conductive layer 734, and an isolation layer 736. Infrared-transmissive layer 732 may include one or more infrared-transmissive materials (e.g. silicon, germanium, zinc selenide, or other non-hydroscopic infrared-transmissive materials). Conductive layer 734 may include nanowires, such as silver nanowires. Alternatively, or in addition, conductive layer 734 may include an infrared-transparent conductive coating (e.g., CdO, doped silicon, or other conductive coating). Isolation layer 736 may include a dielectric and hydrophobic coating (e.g., flouropolymer or other hydrophobic coating) on the side of window 730 facing chamber 716. Conductive layer 734 may be disposed between infrared-transmissive layer 732 and isolation layer 736 except at an exposed area 738 where conductive layer 734 is not covered by isolation layer 736. For example, exposed area may be an edge of window 730. Conductive layer 734 may wrap around a corner and exposed area 738 may extend to the side of window 730 facing away from chamber 716 and in contact with housing 712 such that conductive layer 734 may receive a voltage from that side of window 730.

In some embodiments, windows 720 and 730 have a structure with flat surfaces, and liquid shutter 710 operates as a shutter but not necessarily as a lens with optical power (e.g., optically neutral). For example, window 720 and window 730 may be flat and substantially parallel. In other embodiments, windows 720 and 730 may have a structure that, while in imaging mode, provides optical properties to liquid shutter 710. For example, while in imaging mode, liquid shutter 710, together with the infrared-transparent gas or liquid, may act as an additional lens element.

Referring to FIGS. 8A-B, in one or more embodiments, conductive layer 724 and conductive layer 734 are configured to receive corresponding voltages at exposed area 728 and exposed area 738 through corresponding conductive traces 742 and 744, respectively. In this regard, conductive traces 742 and 744 may be used to effectively implement fluid controller 108 and receive corresponding voltages from power block 114 and/or processor 122 to selectively direct liquid 702 from reservoir 714 (as shown in FIG. 8A) to chamber 716 (as shown in FIG. 8B). Power block 108 or fluid controller 108 may include a high-voltage generator circuit and may be configured to apply a high voltage (e.g., a high voltage pulse) across conductive layer 734 and conductive layer 744. In some embodiments, the high voltage may be a voltage larger than the voltage supplied by a battery powering liquid shutter 710. For example, if the battery provides between 2 to 12 Volts (V) (e.g., approximately 3.7 V), the higher voltage may be between 20 to 200 V (e.g., approximately 90 V). Voltage that is applied across conductive layer 734 and conductive layer 744 may be, for example, between 50 to 150 V. In various embodiments, other voltages and/or voltage ranges may be used as appropriate. Conductive layer 724 and conductive layer 734 may be configured to generate an electric field in response to the voltages to direct liquid 702 from reservoir 714 to chamber 706. For example, in response to the voltages, corresponding electric charges may accumulate on conductive layer 724 and conductive layer 734, and the corresponding electric charges may generate the electric field.

In one or more embodiments, isolation layer 726 and isolation layer 736 are configured to direct liquid 702 from chamber 716 (as shown in FIG. 8B) to reservoir 714 (as shown in FIG. 8A). Isolation layer 726 and isolation layer 736 may direct liquid 702 from chamber 716 to reservoir 714 by isolation layer 726 and isolation layer 736 interacting with liquid 702 in response to discharge of the corresponding electric charges on conductive layer 724 and conductive layer 734. Liquid 702 may be directed from chamber 716 to reservoir 714 by surface tension of liquid 702 to minimize contact of liquid 702 with the hydrophobic surfaces of isolation layer 726 and isolation layer 736. Further, when the infrared imaging system that includes liquid shutter 710 is held by a user, liquid shutter 710 may be oriented such that reservoir 716 is at the lower edge of liquid shutter 710 as shown in FIG. 7B, and liquid 702 may further be directed from chamber 716 to reservoir 714 by gravity.

Liquid 702 may include water, other hydrogen-bonding fluid, a polar fluid, or other fluid, and may include electrolytes or additives. Liquid 702 may be responsive to the electric field generated by conductive layer 724 and conductive layer 734. Further, liquid 702 may be repelled by the hydrophobic surface of isolation layer 726 and isolation layer 736 due to surface tension of liquid 702. Liquid 702 may include fluid that is infrared-opaque and/or include electrolytes or additives that aid in infrared absorption. Reservoir 714 and chamber 716 may include an infrared-transparent gas or liquid, such as air or oil, to fill the volume not occupied by liquid 702.

Referring to FIGS. 7A-C, housing 712 may include conductive trace 742 that is electrically connected to conductive layer 724 directly (e.g., at exposed area 728) or through an appropriate electrical contact, and conductive trace 744 that is electrically connected to conductive layer 734 (e.g., at exposed area 738) directly or through an appropriate electrical contact. Conductive layer 724 and conductive layer 734 may be configured to receive the corresponding voltages through conductive trace 742 and conductive trace 744, respectively.

Housing 712 may also include conductive traces 746 and 748 that are electrically connected to temperature sensor 128, such as thermistor 718. For example, thermistor 718 may receive power and/or communicate measured temperatures to processor 122 through conductive traces 746 and 748.

Figure 10:
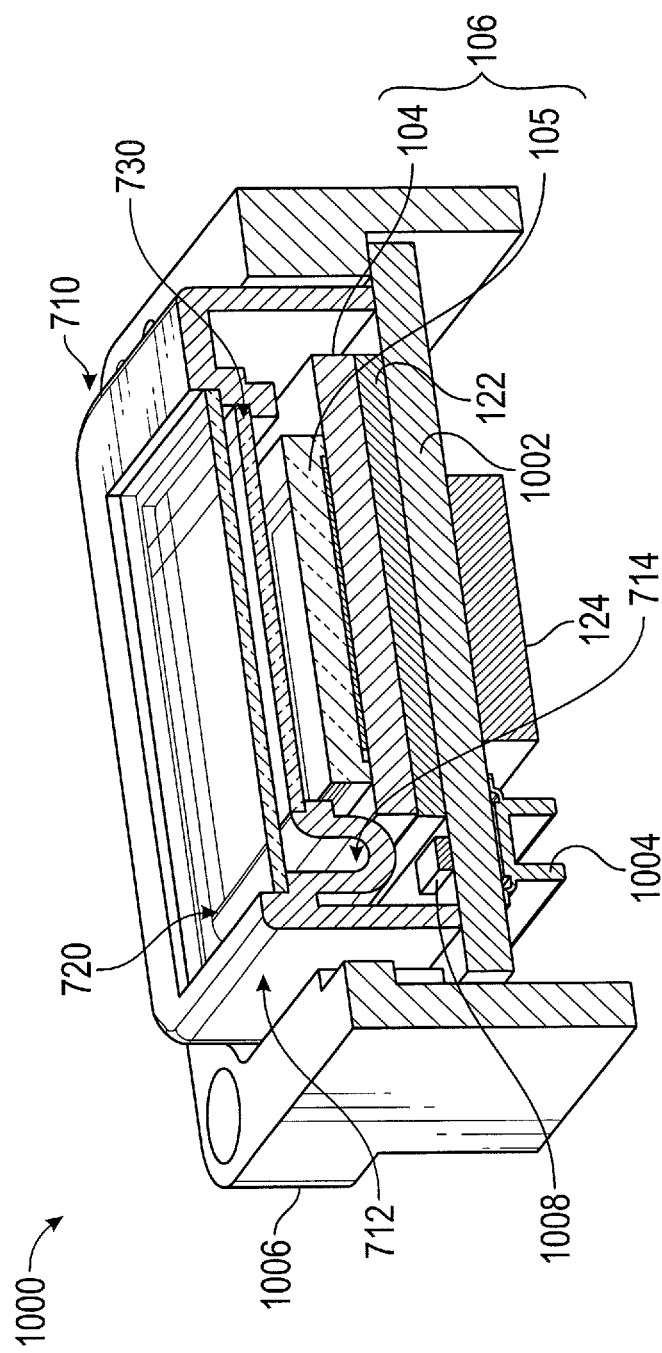
FIG. 10 illustrates a cross-sectional view of the liquid shutter of FIGS. 7A-C taken along line 8-8 of FIG. 7A and implemented with other features to provide an infrared imaging system in accordance with an embodiment of the invention.

FIG. 10 illustrates a cross-sectional view of the liquid shutter 710 of FIGS. 7A-C taken at line 8-8 of FIG. 7A and implemented with other features to provide an infrared imaging system 1000 in accordance with an embodiment of the invention. In various embodiments, infrared imaging system 1000 may include features of infrared imaging device 100. As shown, infrared imaging system 1000 may include an infrared detector package such as infrared detector package 106, a processor such as processor 122, a memory such as memory 124, a printed circuit board (PCB) 1002 (e.g., providing electrical connections between the various components as appropriate), an interconnector 1004, and/or a structure 1006 (e.g., a metal structure) engaging liquid shutter 710 and PCB 1002.

Infrared detector package 106 may include a FPA such as FPA 104, an infrared detector package window such as infrared detector package window 105, a ROIC, and/or other circuitry. In some embodiments, infrared detector package 106 may include a processor such as processor 122. In other embodiments, processor 122 is provided as a separate component from infrared detector package 106. Infrared detector package 106 may be a wafer-level package (WLP) manufactured using WLP technology. Infrared detector package 106 may be disposed inside housing 712. Housing 712 and infrared detector package may be engaged on one side of PCB 1002, and memory 124 and interconnector 1004 may be engaged on the other side of PCB 1002 (e.g., to connect PCB 1002 to power block 114 in FIG. 1). PCB 1002 may include one or more electrical contacts electrically connected with conductive traces 740, such as conductive traces 742, 744, 746, and/or 748. Conductive traces 740 may receive a voltage through the one or more electrical contacts and/or communicate data or information.

FPA 104 may be configured to capture a thermal image of scene 180 in response to infrared radiation received through window 720 and window 730 while liquid 702 is disposed in reservoir 714, as shown in FIG. 8A. FPA 104 may be configured to capture an image of liquid 702 while liquid 702 is disposed in chamber 716 as shown in FIG. 8B.

Processor 122 may be configured to determine FFC terms associated with the FPA based on the thermal image of the liquid. Processor 122 may be configured to determine FFC terms further based on a temperature of liquid 702 measured by thermistor 718 (in FIGS. 7A-B). Processor 122 may store the FFC terms in memory 124. Processor 122 may apply the FFC terms to the thermal image of scene 180. In some embodiments, processor 122 receives thermal image data for scene 180 and applies the FFC terms to the thermal image data. In other embodiments, processor 122 applies the FFC terms to a circuitry (e.g., an ROIC or other circuit), such as by storing the FFC terms in a memory (e.g., memory 124) of the circuitry, and processor 122 receives thermal image data for scene 180 that takes into account the FFC terms.

Processor 122 may be configured to determine radiometric calibration terms associated with the FPA based on the thermal image of the liquid and a temperature of liquid 702 measured by thermistor 718 (in FIGS. 7A-B). Processor 122 may store the radiometric calibration terms in memory 124. Processor 122 may apply the radiometric calibration terms to the thermal image of scene 180.

In some embodiments, tilt/orientation sensors 1008 may also be utilized (e.g., if infrared imaging system 1000 is tilted to one side, the voltage applied may be increased or decreased, for example, to compensate and take into account gravity).

Advantageously, aside from liquid 702, liquid shutter 710 has no moving parts, so the cost and size of infrared imaging system 1000 with such a shutter, such as infrared camera 100, may be greatly reduced. Further, the reliability of infrared camera 100 may be significantly improved.

Figure 11:
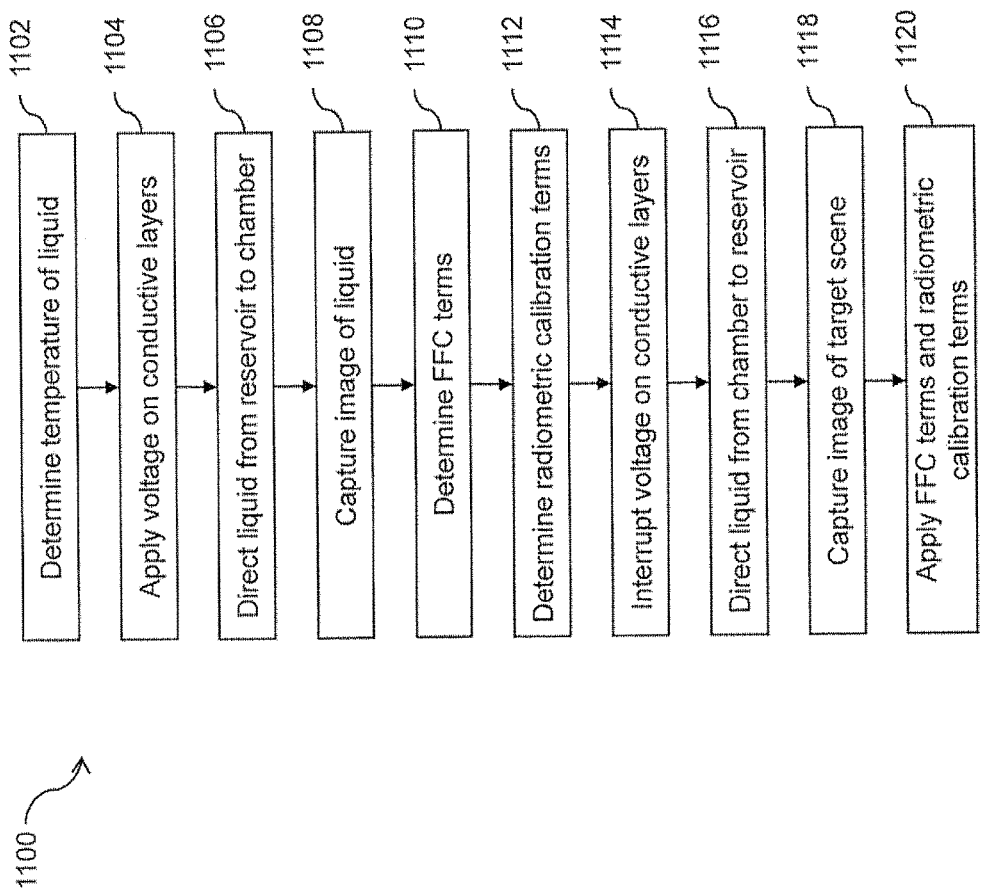
FIG. 11 illustrates another process of calibrating an infrared imaging device using a liquid shutter in accordance with an embodiment of the invention.

FIG. 11 illustrates another process 1100 of calibrating an infrared imaging device such as infrared imaging system 1000 using a liquid shutter such as liquid shutter 710 in accordance with an embodiment of the invention.

At block 1102, a temperature sensor 128 such as thermistor 718 (in FIGS. 7A-B) determines a temperature of a liquid such as liquid 702 (in FIGS. 8A-B).

At block 1104, liquid shutter 710 is activated (e.g., closed, on, in calibration mode, in activated mode, etc.). In one or more embodiments, a voltage is applied across conductive layer 724 of window 720 and conductive layer 734 of window 730 (in FIG. 9). In an example, a fluid controller such as fluid controller 108 (in FIG. 1) applies the voltage across conductive layer 724 and conductive layer 734.

At block 1106, liquid 702 is directed from reservoir 714 to chamber 716 (in FIGS. 8A-B). In some embodiments, conductive layer 724 and conductive layer 734 may be provided corresponding electric charges by the voltage applied across conductive layer 724 and conductive layer 734 at block 1104. The corresponding electric charges on conductive layer 724 and conductive layer 734 may generate an electric field that directs liquid from reservoir 714 to chamber 716.

At block 1108, an FPA such as FPA 105 (in FIG. 1 and FIG. 10) captures a thermal image of liquid 107. While liquid 702 is disposed in chamber 716 (as shown in FIG. 8B), liquid 702 blocks infrared radiation from target scene 180 and effectively operates as a liquid shutter for FPA 105, and FPA 105 may capture a thermal image of liquid 107.

At block 1110, FFC terms associated with FPA 104 may be determined to calibrate infrared imaging system 1000. In one or more embodiments, FFC terms associated with the FPA are determined based on the thermal image of liquid 702. The FFC terms may be determined further based on the temperature of liquid 702. In an example, the FFC terms may be determined by a processor such as processor 122 (in FIG. 1 and FIG. 10). Calibration using FFC terms are further described in U.S. Pat. No. 8,373,757, issued Feb. 12, 2013, and U.S. Patent Application Publication No. 2013/0147966, published Jun. 13, 2013, all of which are incorporated by reference in their entirety.

At block 1112, radiometric calibration terms associated with FPA 104 may be determined to calibrate infrared imaging system 1000. Radiometric calibration terms may be determined based on the thermal image of liquid 702 and the temperature of liquid 702. In an example, the FFC terms may be determined by processor 122.

At block 1114, liquid shutter 710 is deactivated (e.g., open, off, in imaging mode, in deactivated mode, etc.). In one or more embodiments, the applying of the voltage across conductive layer 724 and conductive layer 734 at block 1104 is interrupted. In some embodiments, the interruption may include discharging the corresponding charges that built up and accumulated on conductive layer 724 and conductive layer 734 (e.g., by leaking of the charges and/or grounding conductive layer 724 and conductive layer 734). In an example, a fluid controller 108 interrupts the applying of the voltage across conductive layer 724 and conductive layer 734.

At block 1116, liquid 702 is directed from chamber 716 to reservoir 714. In some embodiments, liquid 702 is directed from chamber 716 to reservoir 714 by isolation layer 726 of window 720 and isolation layer 736 of window 730 interacting with liquid 702 and by surface tension of liquid 702 in response to the discharging of the corresponding charges on conductive layer 724 and conductive layer 734 at block 1114.

At block 1118, FPA 105 captures a thermal image of scene 180 in response to infrared radiation received through window 720 and window 730. While liquid 702 is disposed in reservoir 714 (as shown in FIG. 8A), infrared radiation from a target scene is received through window 720 and window 730, and FPA 105 may capture a thermal image of scene 180.

At block 1120, the FFC terms and the radiometric calibration terms determined at blocks 1110 and 11102 are be applied. In some embodiments, the FFC terms and/or the radiometric calibration terms are applied to the thermal image of scene 180 captured at block 1118. For example, processor 122 may apply the FFC terms and/or the radiometric calibration terms to the thermal image of scene 180 received from FPA 104.

In other embodiments, the FFC terms and/or the radiometric calibration terms are applied to a circuitry (e.g., an ROIC or other circuit), such as by storing the FFC terms and/or the radiometric calibration terms in a memory (e.g., memory 124) of the circuitry, and processor 122 receives the thermal image of the scene that takes into account the FFC terms and/or the radiometric calibration terms from FPA 104 through the circuitry.

Process 1100 and one or more blocks 1102-1120 of process 1100 may be repeated as desired. In certain embodiments, the order of blocks 1102-1120 may be varied and one or more blocks 1102-1120 may be omitted.

In one embodiment, a system includes a housing; a reservoir disposed within the housing and configured to hold a liquid; a first window comprising a first conductive layer; and a second window comprising a second conductive layer and positioned relative to the first window to define a chamber between the first window and the second window, the first conductive layer and the second conductive layer configured to receive corresponding voltages to selectively direct the liquid from the reservoir to the chamber. In another embodiment, the first conductive layer and the second conductive layer are configured to accumulate corresponding electric charges that generate an electric field in response to the voltages to direct the liquid from the reservoir to the chamber. In another embodiment, the first conductive layer and the second conduction layer are configured to discharge in response to an interruption of the received corresponding voltages.

In another embodiment, the first window comprises a first isolation layer, the second window comprises a second isolation layer, and the first isolation layer and the second isolation layer are configured to direct the liquid from the chamber to the reservoir. In another embodiment, the first isolation layer and the second isolation layer are dielectric and hydrophobic, and the liquid comprises polar or hydrogen-bonding liquid.

In another embodiment, the first window and the second window are infrared transparent, and the system further includes a focal plane array (FPA) configured to capture a thermal image of a scene in response to infrared radiation received through the first window and the second window. In another embodiment, the liquid is infrared-opaque and selectively blocks infrared radiation from the scene while the liquid is disposed in the chamber, and the FPA is configured, to capture an image of the liquid.

In another embodiment, the system further includes a memory configured to store flat field correction (FFC) terms; and a processor configured to determine the FFC terms associated with the FPA based on the thermal image of the liquid, and apply the FFC terms to the thermal image of the scene. In another embodiment, the system further includes a temperature sensor configured to measure a temperature of the liquid, and the processor is configured to determine the FFC terms further based on the temperature. In another embodiment, the system further includes a temperature sensor configured to measure a temperature of the liquid; a memory configured to store radiometric calibration terms; and a processor configured to determine the radiometric calibration terms associated with the FPA based on the thermal image of the liquid and the temperature, and apply the radiometric calibration terms to the thermal image of the scene.

In another embodiment, an infrared detector package comprising the FPA is disposed within the housing. In another embodiment, the infrared detector package is a wafer-level package.

In another embodiment, the housing is a molded interconnect device (MID) comprising one or more conductive traces, and the first conductive layer and the second conductive layer are configured to receive the corresponding voltages through the one or more conductive traces. In another embodiment, the first window comprises a first exposed area where the first conductive layer is not covered by a first isolation layer and electrically connected to least one of the one or more conductive traces, and the second window comprises a second exposed area where the second conductive layer is not covered by a second isolation layer and electrically connected to at least another of the one or more conductive traces.

In another embodiment, the first exposed area comprises a first edge of the first window, and the second exposed area comprises a second edge of the second window. In another embodiment, the housing is engaged on a printed circuit board (PCB) comprising one or more electrical contacts electrically connected to the one or more conductive traces, and the one or more conductive traces receive the corresponding voltages through the one or more electrical connections.

In another embodiment, the reservoir is integrated with the housing. In another embodiment, the first window and the second window are flat and substantially parallel.

In another embodiment, the first conductive layer and the second conductive layer comprise nanowires. In another embodiment, the system further includes a temperature sensor configured to measure a temperature of the liquid, and the temperature sensor comprises a thermistor disposed in the reservoir.

In another embodiment, a method includes applying a voltage across a first window comprising a first conductive layer and a second window comprising a second conductive layer, wherein the first window and the second window defines a chamber between the first window and the second window; and directing a liquid from a reservoir disposed within a housing to the chamber. In another embodiment, the method further includes interrupting the applying of the voltage; and directing the liquid from the chamber to the reservoir by the first window comprising a first isolation layer and the second window comprising a second isolation layer interacting with the liquid.

In another embodiment, the directing of the liquid from the reservoir to the chamber comprises providing corresponding electric charges on the first conductive layer and the second conductive layer by the applying of the voltage to generate an electric field. In another embodiment, the interrupting comprises discharging the corresponding electric charges on the first conductive layer and the second conductive layer, and the directing of the liquid from the chamber to the reservoir is in response to the discharging. In another embodiment, the first isolation layer and the second isolation layer are dielectric and hydrophobic, and the liquid comprises polar or hydrogen-bonding liquid.

In another embodiment, the first window and the second window are infrared transparent, and the method further includes capturing, by a focal pane array (FPA), a thermal image of a scene in response to infrared radiation received through the first window and the second window. In another embodiment, the liquid is infrared-opaque and selectively blocks infrared radiation from the scene while the liquid is disposed in the chamber, and the method further includes capturing, by the FPA, a thermal image of the liquid.

In another embodiment, the method further includes determining flat field correction (FFC) terms associated with the FPA based on the image of the liquid; and applying the FFC terms to the thermal image of the scene. In another embodiment, the method further includes measuring a temperature of the liquid, and the determining of the FFC terms is further based on the temperature. In another embodiment, the method further includes measuring a temperature of the liquid; determining radiometric calibration terms based on the thermal image of the liquid and the temperature; and applying the radiometric calibration terms to the thermal image of the scene.

In another embodiment, an infrared detector package comprising the FPA is disposed within the housing. In another embodiment, the infrared detector package is a wafer-level package.

In another embodiment, the housing is a molded interconnect device (MID) comprising one or more conductive traces and integrated with the reservoir, and the applying of the voltage is through the one or more conductive traces. In another embodiment, the first window comprises a first exposed area where the first conductive layer is not covered by a first isolation layer and electrically connected to least one of the one or more conductive traces, the second window comprises a second exposed area where the second conductive layer is not covered by a second isolation layer and electrically connected to at least another of the one or more conductive traces, and the applying of the voltage is through the first exposed area and the second exposed area.

In another embodiment, the first exposed area comprises a first edge of the first window, the second exposed area comprises a second edge of the second window, and the applying of the voltage is through the first edge and the second edge. In another embodiment, the housing is disposed on a printed circuit board (PCB) comprising one or more electrical contacts connected to the one or more conductive traces, and the applying of the voltage is through the one or more electrical connections.

In another embodiment, the reservoir is integrated with the housing. In another embodiment, the first window and the second window are flat and substantially parallel.

In another embodiment, the first conductive layer and the second conductive layer comprise nanowires, and the applying of the voltage is through the nanowires. In another embodiment, the method further includes measuring a temperature of the liquid while the liquid is disposed in the reservoir.

Where applicable, the various described embodiments may be implemented using hardware, software, or combinations of hardware and software. Also where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the spirit of the disclosure. In addition, where applicable, it is contemplated that software components may be implemented as hardware components, and vice-versa. In some embodiments, such hardware components (e.g., processing and control block 120) may be implemented as one or more appropriate processors and/or processing devices (e.g., logic device, microcontroller, processor, application specific integrated circuit (ASIC), field programmable gate array (FPGA), or other device) that may be used to execute appropriate instructions, such as software instructions implementing any of the processes described herein.

Software in accordance with the various described embodiments, such as program code and/or data, may be stored on one or more machine readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

We claim:

1. A device, comprising:
a focal plane array (FPA) configured to receive infrared radiation from a scene;
a liquid shutter housing comprising a cavity;
a fluid controller; and
infrared-opaque liquid disposed within the cavity, wherein the fluid controller is configured to direct the liquid from a reservoir area of the cavity to a field of view (FOV) area of the cavity to block the FPA from the infrared radiation.

2. The device of claim 1, wherein:
the liquid comprises ferrofluid;
the device further comprises one or more electromagnets configured to generate a magnetic field; and
the fluid controller is configured to direct the liquid from the reservoir area to the FOV area by operating the one or more electromagnets to generate the magnetic fields.

3. The device of claim 1, wherein:
the liquid comprises a hydrogen-bonding fluid and/or a polar fluid;
the device further comprises two or more infrared-transparent electrodes;
an inside surface of the liquid shutter housing facing the cavity comprises a hydrophobic surface; and
the fluid controller is configured to direct the liquid from the reservoir area to the FOV area by applying a voltage across two of the two or more electrodes.

4. The device of claim 1, further comprising a pump, wherein the fluid controller is configured to direct the liquid from the reservoir area to the FOV area by operating the pump.

5. The device of claim 1, wherein:
the liquid shutter housing comprises a first window and a second window positioned relative to the first window to form the FOV area of the cavity between the first window and the second window; and
the reservoir area of the cavity is disposed within the liquid shutter housing.

6. The device of claim 1, wherein the FPA is provided in a wafer-level package (WLP) disposed within the liquid shutter housing.

7. The device of claim 1, wherein:
the liquid shutter housing comprises a molded interconnect device (MID) comprising one or more conductive traces configured to transmit voltages from the fluid controller; and
the liquid shutter housing is engaged on a printed circuit board (PCB) comprising one or more electrical contacts electrically connected to the one or more conductive traces.

8. The device of claim 1, further comprising:
a memory configured to store a set of flat field correction values; and
a processor configured to:
operate the fluid controller to direct the liquid; and
calibrate the FPA to determine the set of flat field correction values based at least in part on infrared radiation received at the FPA from the liquid in response to the liquid being directed to the FOV area; and
store the set of flat field correction values in the memory.

9. The device of claim 1, further comprising:
a temperature sensor configured to detect a temperature of the liquid or the liquid shutter housing; and
a processor configured to:
operate the temperature sensor to detect the temperature; and
perform a radiometric calibration of the FPA based at least in part on the detected temperature.

10. The device of claim 1, wherein the FPA is configured to capture thermal image data in response to the infrared radiation received from the scene.

11. A method comprising:
receiving infrared radiation from a scene at a focal plane array (FPA); and
selectively directing, by a fluid controller, infrared-opaque liquid disposed within a cavity of a liquid shutter housing such that the liquid moves from a reservoir area of the cavity to a field of view (FOV) area of the cavity to block the FPA from the infrared radiation.

12. The method of claim 11, wherein:
the liquid comprises ferrofluid; and
the selectively directing comprises operating one or more electromagnets to generate a magnetic field to direct the liquid from the reservoir area to the FOV area of the cavity.

13. The method of claim 11, wherein:
the liquid comprises a hydrogen-bonding fluid and/or a polar fluid; and
the selectively directing comprises applying a voltage across two electrodes to direct the liquid from the reservoir area to the FOV area of the cavity.

14. The method of claim 11, wherein the selectively directing comprises pumping, by the fluid controller operating a pump, the liquid to direct the liquid from the reservoir area to the FOV area.

15. The method of claim 11, wherein the selectively directing moves the liquid from the reservoir area disposed within the liquid shutter housing to the FOV area formed between a first window and a second window of the liquid shutter housing.

16. The method of claim 15, wherein the first and the second windows are infrared-transparent, the method further comprising capturing, by the FPA, a thermal image of the scene in response to infrared radiation received through the first and the second windows.

17. The method of claim 15, wherein the liquid blocks the FPA from receiving the infrared radiation from the scene while the liquid is disposed between the first and the second windows, the method further comprising capturing, by the FPA, a thermal image of the liquid while disposed between the first and the second windows.

18. The method of claim 17, further comprising calibrating the FPA to determine a set of flat field correction values based at least in part on the captured thermal image of the liquid.

19. The method of claim 11, further comprising:
determining, by a temperature sensor, a temperature of the liquid shutter housing or the liquid; and
performing a radiometric calibration of the FPA based at least in part on the determined temperature.

20. The method of claim 11, wherein the infrared radiation is thermal infrared radiation.

* * * * *

UNITED STATES PATENT AND TRADEMARK OFFICE
CERTIFICATE OF CORRECTION

PATENT NO. : 10,393,575 B2
APPLICATION NO. : 15/660870
DATED : August 27, 2019
INVENTOR(S) : Vu L. Nguyen et al.

It is certified that error appears in the above-identified patent and that said Letters Patent is hereby corrected as shown below:

In the Specification

In the Detailed Description:

In Column 4, Lines 44-45, change "with a thermalized optics" to --with athermalized optics--.

In Column 13, Line 8, change "explored" to --exploded--.

Signed and Sealed this
Twenty-eighth Day of January, 2020

Andrei Iancu
*Director of the United States Patent and Trademark Office*